(12) United States Patent
Gerstel et al.

(10) Patent No.: US 8,971,706 B2
(45) Date of Patent: Mar. 3, 2015

(54) LINK DISCOVERY, VERIFICATION, AND FAILURE ISOLATION IN AN OPTICAL COMMUNICATION SYSTEM

(75) Inventors: Ornan A. Gerstel, Los Altos, CA (US); Humair Raza, Sunnyvale, CA (US); Rajiv Ramaswami, Sunnyvale, CA (US); Babu O. Narayanan, San Jose, CA (US); Robert Ward, Sunnyvale, CA (US); Robert Keys, Stittsville (CA); David Park, Kanata (CA); Vasant Sahay, Sunnyvale, CA (US); Osama Aboul-Magd, Kanata (CA); Frederic Simard, Nepean (CA)

(73) Assignee: Rockstar Consortium US LP, Plano, TX (US)

( * ) Notice: Subject to any disclaimer, the term of this patent is extended or adjusted under 35 U.S.C. 154(b) by 2680 days.

(21) Appl. No.: 10/261,099

(22) Filed: Sep. 30, 2002
(Under 37 CFR 1.47)

(65) Prior Publication Data
US 2004/0008988 A1 Jan. 15, 2004

Related U.S. Application Data

(60) Provisional application No. 60/326,034, filed on Oct. 1, 2001, provisional application No. 60/399,604, filed on Jul. 30, 2002.

(51) Int. Cl.
| H04J 14/00 | (2006.01) |
|---|---|
| H04J 14/02 | (2006.01) |
| H04B 10/032 | (2013.01) |
| H04B 10/07 | (2013.01) |
| H04B 10/077 | (2013.01) |
| H04B 10/079 | (2013.01) |
| H04B 10/27 | (2013.01) |

(52) U.S. Cl.
CPC .......... *H04J 14/0227* (2013.01); *H04B 10/032* (2013.01); *H04B 10/07* (2013.01); *H04B 10/0775* (2013.01); *H04B 10/0793* (2013.01); *H04B 10/27* (2013.01); *H04J 14/0287* (2013.01); *H04J 14/0241* (2013.01); *H04B 2210/071* (2013.01); *H04B 2210/075* (2013.01); *H04J 14/0279* (2013.01); *H04J 14/0284* (2013.01); *H04J 14/0294* (2013.01); *H04J 14/0297* (2013.01)
USPC .................................. 398/57; 398/56; 398/50

(58) Field of Classification Search
USPC ............... 398/1–20, 21–38, 41–73; 356/73.1; 370/351, 254
See application file for complete search history.

(56) References Cited

U.S. PATENT DOCUMENTS

| 5,365,344 | A | * | 11/1994 | Eda et al. .......................... 398/79 |
|---|---|---|---|---|
| 5,396,357 | A | * | 3/1995 | Goossen et al. ................ 398/59 |
| 5,708,753 | A | * | 1/1998 | Frigo et al. ..................... 385/147 |
| 5,815,489 | A | * | 9/1998 | Takatori et al. ................ 370/217 |
| 5,889,600 | A | * | 3/1999 | McGuire ......................... 398/50 |

(Continued)

FOREIGN PATENT DOCUMENTS

| EP | 0 624 992 A2 | 4/1994 | ............... H04Q 3/68 |
|---|---|---|---|
| EP | 0 835 005 A2 | 3/1997 | .............. H04J 14/02 |

(Continued)

*Primary Examiner* — M. R. Sedighian
(74) *Attorney, Agent, or Firm* — Withrow & Terranova, PLLC

(57) ABSTRACT

Automatic discovery and verification of optical communication links as well as isolation of link failures in an optical communication system.

8 Claims, 27 Drawing Sheets

(56) References Cited

U.S. PATENT DOCUMENTS

| | | | |
|---|---|---|---|
| 5,907,417 A | 5/1999 | Darcie et al. | 359/110 |
| 5,930,017 A * | 7/1999 | Davis et al. | 398/7 |
| 6,115,517 A | 9/2000 | Shiragaki et al. | 385/24 |
| 6,226,111 B1 * | 5/2001 | Chang et al. | 398/9 |
| 6,366,716 B1 | 4/2002 | Graves | 385/17 |
| 6,477,288 B1 * | 11/2002 | Sato | 385/16 |
| 6,493,117 B1 * | 12/2002 | Milton et al. | 398/49 |
| 6,529,300 B1 * | 3/2003 | Milton et al. | 398/59 |
| 6,542,660 B1 | 4/2003 | Medin et al. | 385/24 |
| 6,556,321 B1 * | 4/2003 | Milton et al. | 398/79 |
| 6,708,000 B1 * | 3/2004 | Nishi et al. | 398/1 |
| 6,853,763 B1 | 2/2005 | McNicol et al. | 385/17 |
| 6,873,796 B1 * | 3/2005 | Nakahira | 398/51 |
| 6,990,111 B2 * | 1/2006 | Lemoff et al. | 370/400 |
| 6,996,342 B2 * | 2/2006 | Park et al. | 398/48 |
| 7,031,288 B2 * | 4/2006 | Ogier | 370/338 |
| 7,031,607 B1 * | 4/2006 | Aswood Smith | 398/51 |
| 7,046,928 B1 * | 5/2006 | Bradford et al. | 398/9 |
| 7,110,364 B1 * | 9/2006 | Le et al. | 370/242 |
| 2001/0038471 A1 * | 11/2001 | Agrawal et al. | 359/110 |
| 2002/0006112 A1 * | 1/2002 | Jaber et al. | 370/238 |
| 2002/0109879 A1 * | 8/2002 | Wing So | 359/118 |
| 2002/0186432 A1 * | 12/2002 | Roorda et al. | 359/128 |
| 2003/0002779 A1 | 1/2003 | Bobin et al. | 385/17 |
| 2003/0043427 A1 * | 3/2003 | Robidas et al. | 359/110 |
| 2003/0128985 A1 | 7/2003 | Elbers et al. | 398/83 |
| 2003/0152072 A1 | 8/2003 | Guild et al. | 370/386 |
| 2004/0208509 A1 | 10/2004 | Gerstel et al. | 398/19 |

FOREIGN PATENT DOCUMENTS

| | | | |
|---|---|---|---|
| WO | WO00/30300 | 5/2000 | H04L 12/56 |
| WO | WO 01/33897 A2 | 5/2001 | H04Q 11/00 |
| WO | WO 02/104064 A2 | 12/2002 | H04Q 11/00 |

* cited by examiner

Type 1: TNE ports have no multiplexing

Type 2: TNE ports have multiplexing capability at both ends

Type 3: TNE ports have multiplexing capability at one end

Type 1: No OEO between client and PXC

Type 2 (a): OEO between client and PXC

Type 2 (b): 4:1 mux between client and PXC

Type 3: Remote client

Type 1(a): Collocated PXC and EXC, Non-integrated OEO and EXC interface

Type 1(b): Collocated PXC and EXC, Integrated OEO and EXC interface

Type 2(a): Non-collocated PXC and EXC, Non-integrated OEO and EXC interface

Type 2(b): Non-collocated PXC and EXC, Integrated OEO and EXC interface

1: Failure of PXC Tx → OEO Rx link
2: Failure of OEO Tx → Regen Rx link (or Regen Tx → Regen Rx link)
3: Failure of Regen Tx → OEO Rx link
4: Failure of OEO Tx → PXC Rx link
5: Failure of OEO Tx → OEO Rx link
6: Failure of Client Tx → PXC Rx link
7: Failure of PXC Tx → Client Rx link
8: Failure of PXC cross-connection (a) Normal mode (b) Equipment protection (c) Network protection

US 8,971,706 B2

LINK DISCOVERY, VERIFICATION, AND FAILURE ISOLATION IN AN OPTICAL COMMUNICATION SYSTEM

PRIORITY

The present application claims priority from the following commonly-owned provisional patent applications, which are hereby incorporated herein by reference in their entireties:

U.S. Provisional Patent Application No. 60/326,034 filed Oct. 1, 2001; and

U.S. Provisional Patent Application No. 60/399,604 filed Jul. 30, 2002.

FIELD OF THE INVENTION

The present invention relates generally to optical communications, and more particularly to link discovery, verification, and failure isolation in an optical communication system.

SUMMARY OF THE INVENTION

In one embodiment of the invention there is provided a method for determining optical communication links between two adjacent network elements in an optical communication system. Each network element includes a number of transmit interfaces and a number of receive interfaces. The method involves causing a first one of the network elements to generate an optical signal over one of its transmit interfaces; causing the optical signal to be received at either a receive interface of a second one of the network elements or a receive interface of said first one of the network elements; and detecting an optical communication link between the transmit interface of the first network element and the receive interface of the second network element and a corresponding optical communication link between the transmit interface of the second network element and the receive interface of the first network element based upon at least the received optical signal. Among others, the optical signal can include a sustained light on condition, a sustained light off condition, a plurality of successive light on and light off conditions that vary according to a predetermined pattern, an optical signal that is modulated according to a predetermined data sequence, an optical signal that is modulated according to a pilot tone, an optical signal at an unused wavelength, amplified spontaneous emission noise, an alarm signal, and/or an optical signal that produces an invalid received signal at the receive interface. The second network element may instruct the first network element to generate the optical signal using a predetermined protocol. In order for the first network element to generate the optical signal, a test transmitter may be allocated and crossconnected to the transmit interface of the first network element. In certain embodiments, in order for the optical signal to be received at the receive interface of the first network element, the optical signal may be received at a receive interface of the second network element and looped back from the receive interface of the second network element to a transmit interface of the second network element. In certain embodiments, in order for the optical signal to be received at the receive interface of the first network element, a test receiver may be allocated to the receive interface of the first network element. The optical signal may include an identity pattern that uniquely identifies the transmit port of the first network element, in which case the optical communication link may be detected by recovering the identity pattern from the received optical signal and detecting the optical communication link based upon the recovered identity pattern, for example, using a table that maps each of a number of identity patterns to a corresponding transmit interface of the first network element and determining from the table that the recovered identity pattern maps to the transmit interface of the first network element. Such a table may also map each identity pattern and corresponding transmit interface of the first network element to a corresponding receive interface of the first network element, in which case the optical communication link between the transmit interface of the second network element and the receive interface of the first network element can be inferred from the mapping in the table.

In another embodiment of the invention there is provided a method for failure isolation in an optical communication system. The method involves establishing a lightpath from a first end-node to a second end-node through a number of photonic cross-connect devices and associated optical devices; generating defect indications by a number of devices in response to a failure in the optical communication system; receiving the defect indications by at least one of the photonic cross-connect devices; and isolating the failure based upon the defect indications received by the photonic cross-connect devices. The method may also involve updating a link state database to indicate the status of each of a number of links associated with the lightpath. Generating defect indications by a number of devices in response to a failure in the optical communication system may involve turning off a laser, producing an invalid received signal condition, producing a loss of light condition, producing a loss of signal condition, producing a loss of frame condition, producing a loss of transitions condition, and/or producing an alarm indication signal. The method may also involve passing a defect indication from a photonic cross-connect device to an end-node through a device adjacent to the end-node or through an out-of-band signaling mechanism. Isolating the failure based upon the defect indications received by the photonic cross-connect devices may involve identifying the first photonic cross-connect device along the lightpath to receive a defect indication; determining a port of said first photonic cross-connect device on which the defect indication was detected; and isolating the failure based upon said port. Isolating the failure based upon the defect indications received by the photonic cross-connect devices may additionally or alternately involve carrying out a link verification process on all links associated with the failed lightpath to determine a status for each link and isolating the failure based upon the status for each link as determined by the link verification process. The optical communication system may include a wrapper-based wavelength division multiplexed network supporting fault type fault location with a wrapper overhead, in which case generating defect indications by a number of devices in response to a failure in the optical communication system may involve generating the defect indications based upon fault type fault location information in the wrapper overhead.

In another embodiment of the invention there is provided an optical communication system having a plurality of interconnected network elements, each network element comprising a number of transmit interfaces and a number of receive interfaces; means for automatically discovering optical communication links between adjacent network elements; and means for verifying the optical communication links. The means for automatically discovering optical communication links between adjacent network elements may include means for causing a first one of the network elements to generate an optical signal over one of its transmit interfaces; means for causing the optical signal to be received at one either a receive interface of a second one of the network elements or a receive interface of said first one of the network elements; and means for detecting an optical communication link between the transmit interface of the first network element and the receive interface of the second network element and a corresponding optical communication link between the transmit interface of the second network element and the receive interface of the first network element based upon at least the received optical signal. The optical communication system may also include means for isolating a failure in the optical communication system, such as means for generating defect indications by a number of network elements in response to the failure; means for receiving the defect indications by at least one photonic cross-connect device among the plurality of interconnected network elements; and means for isolating the failure based upon the defect indications received by the at least one photonic cross-connect device.

DETAILED DESCRIPTION OF A PREFERRED EMBODIMENT

Figure 1:
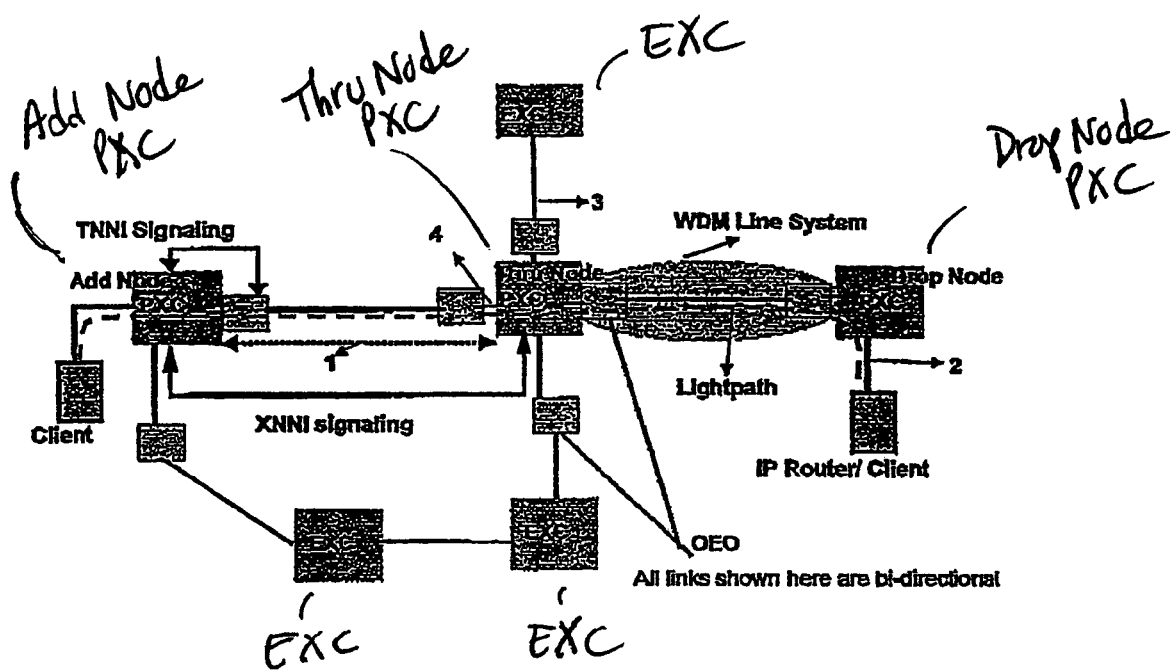
FIG. 1 shows an exemplary opaque application of a PXC in accordance with an embodiment of the present invention.

As used in this description and the accompanying claims, the following terms shall have the meanings indicated, unless the context otherwise requires:

| | |
|---|---|
| Add-node | The first photonic crossconnect (PXC) encountered in the direction of signal flow. For a bi-directional lightpath, the same PXC would be a Drop-node for the signal flowing in the reverse direction. |
| All-optical | Optical switching without OEO conversions in the data path. |
| ADP | Autodiscovery process - process for automatically discovering and verifying physical adjacencies and optical connectivity involving PXCs in an optical network. |
| AIS | Alarm Indication Signal - a signal that may be generated by a node after an IRS is detected. In the case of SONET, we are interested in Line AIS (AIS-L) condition. |
| BDI | Backward Defect Indicator. |
| BER | Bit Error Rate. |
| Client | An NE in which a lightpath originates or terminates, such as an Internet Protocol router or SONET Add/Drop Multiplexer. |
| Demux | Demultiplexer. |
| Digital Wrapper | An implementation of ITU-T standard for optical transport network (OTN), where the client payload is encapsulated within a standardized framing structure, denoted as wrapper, to provide transparent interface to the optical network. The terms "Digital Wrapper" and "Wrapper" will be used interchangeably. |
| Drop-node | The last PXC encountered in the direction of signal flow. For a bi-directional lightpath, the same PXC will be an Add-node for the signal flowing in the reverse direction. |
| Drop side | The Client or PXC facing port of an OEO which is not WDM wavelength specific. It normally operates in 1310 inn range for SR and VSR interfaces, where as 1550 nm for IR and LR interlaces. |

| | |
|---|---|
| DWDM | Dense WDM. |
| End node | An add-node or a drop-node. |
| EXC | Electrical Crossconnect - an OXC in which optical signals are processed electronically through OEO conversions. |
| FDI | Forward Defect Indicator. |
| IR | Intermediate Reach. |
| IRS | Invalid Received Signal - a condition that can arise from LOF, LOL, LOT, High BER, and other events. It does not include an AIS condition. |
| Line side | The interface between an OEO and possibly another OEO which is WDM wavelength specific. |
| Lightpath | A path providing connectivity between two Clients of an optical network to facilitate (bi-directional) transmission of signals in the optical domain. For the opaque application, a lightpath may traverse a number of OEOs. |
| LOF | Loss Of Frame. |
| LOL | Loss Of Light. |
| LOS | Loss Of Signal. |
| LOT | Loss Of Transitions. |
| LR | Long Reach. |
| Mux | Multiplexer - combines multiple optical signals onto a single fiber. |
| NE | Network Element. |
| NMS | Network Management System. |
| OEO | Optical-to-Electrical-to-Optical conversion. A transponder (wavelength translator) to translate an input 1550 nm wavelength to the same or other 1550 nm wavelength, where the process of translation involves converting optical signal to electrical signal and back to optical. Due to this particular sequence of conversion, it is assumed that such a device has access to the signal payload to detect BER, trace ID, etc. The term OEO will also be used to reference any device that converts 1310 nm to 1550 nm (WDM) wavelength. |
| OCh link | A physical link starting from an OEO and terminating at a corresponding OEO and is wavelength specific. Hence for an OEO that performs 1310 to 1550 nm conversion, OCh link will start and terminate at the 1550 nm side. |
| Opaque | Optical switching with OEO conversion in the data path. |
| OPI | OEO Provisioning Interface. An out-of-band signaling protocol that enables non-real-time information to be exchanged between a PXC and an adjacent TNE. |
| OXC | Optical Crossconnect - a system that switches optical signals between various inputs and outputs. |
| PXC | Photonic Crossconnect - an OXC in which no optical-to-electrical conversions occur in the data path. |
| Rx | Receiver. |
| SDH | Synchronous Digital Hierarchy. An ITU standard for synchronous data transmission over fiber optic networks. |
| SONET | Synchronous Optical Network. An ANSI standard for synchronous data transmission over fiber optic networks. |
| SLA | Service Level Agreement - a level of service to be provided to a Client by the network. |
| SPMesh | Shared Path protected Mesh. |
| SR | Short Reach. |
| Thru-node | A PXC that is used to pass a lightpath through (i.e., does not terminate the lightpath). |
| TNE | Transport NE - an NE that represents a collection of OEOs. |
| TNE ports | Same as OEO. |
| TNNI | Transport Node to Network Interface. An out-of-band signaling protocol that enables real-time information, such as defect indications, to be exchanged between a PXC and an adjacent TNE. |
| Tx | Transmitter. |
| UNI | User to Network Interface - the interface between a client node and the PXC. |
| VOA | Variable Optical Attenuator. |
| VSR | Very Short Reach. |
| WDM | Wavelength Division Multiplexing - any technique by which two or more optical signals having different wavelengths may be simultaneously transmitted in the same direction over one fiber, and then be separated by wavelength at the distant end. |
| WDM line system | A collection of NEs required to transport a WDM signal. This includes OEOs, optical amplifiers, optical fiber, as well as other passive devices such as WDM couplers etc. |
| WDM link | A physical link carrying WDM signals. It starts from a WDM multiplexer (after an OEO) and terminates at a WDM demultiplexer (before an OEO). |
| XNNI | The PXC—PXC signaling interface. An out-of-band signaling protocol that enables exchange of control and possibly defect information between adjacent PXCs. |

It should be noted that the terms TNNI and XNNI are used as generic names for certain signaling protocols used in various embodiments of the invention and are not meant to reference any specific protocols that bear the same names.

1 Introduction

Several techniques are described for accomplishing automatic discovery and verification of physical adjacencies and optical connectivity involving PXCs in an optical network. Opaque as well as All-Optical applications of PXC are covered. Several methods for isolating failures are also described.

1.1 Photonic Crossconnect (PXC)

For the sake of this discussion, a system is said to be a PXC if it is an OXC with no Optical-Electrical conversions that are performed in the data path in the system. Furthermore, for the sake of this discussion, it is assumed that the PXC has duplex ports and it is strictly non-blocking (i.e., any port can be connected to any other port in the system). It is assumed here that the PXC duplex port has an input port and an output port and is interconnected to other equipment via separate fibers. An input port of the PXC is called a PXC Rx port. The output port of the PXC is called a PXC Tx port. It is assumed that the PXC Rx port can detect optical power level on the incoming signal and hence recognize LOS if the input power goes below a set threshold.

1.2 DWDM Systems

DWDM systems are Optical transport systems that provide increased capacity by multiplexing several wavelengths on one fiber. Today, most DWDM systems are point-to-point DWDM systems. In this case, the DWDM line systems may be connected using terminal equipment to optical crossconnects to create an optical network. The DWDM links are terminated by terminal equipment such as transponders. They will be called WDM OEO for the purpose of this discussion. The WDM OEO is responsible for regenerating an optical signal by performing an OEO conversion. The WDM OEO may be modeled as having four ports—two ports facing the PXC (also called Drop-side ports) and two ports facing the DWDM line equipment (such as Mux/Demux), also called Line-side ports. The four ports may be located on one or more physical cards. The signals generated by the WDM transponders use different wavelengths spaced sufficiently apart and are multiplexed by a Mux and fed on to a single fiber. The combined signal is amplified every 50 or so kilometers. At the end of the link, the signal is demultiplexed by a Demux, and the separate wavelengths are fed into the WDM Receiver equipment. Note that the drop side interfaces of the WDM equipment may not use WDM wavelengths. In the case of an All-optical network, the individual channels on the WDM link are not necessarily terminated by WOM OEOs immediately after demultiplexing. Instead, the signal maybe switched—using a PXC—into a WDM channel belonging to another WDM link. The signal may be terminated using a WDM OEO device only when it leaves the optical network or if there is need for electrical regeneration to increase the signal to noise ratio.

2 Links

FIG. 1 shows an exemplary opaque application of a PXC in accordance with an embodiment of the present invention. The network consists of WDM line systems, OXCs, and Client equipment. The WDM line systems are assumed to be point-to-point transmission systems for the purpose of this document, meaning that all channels in a WDM link are terminated at the same location. The OXCs may be PXCs or EXCs. Examples of Client equipment include IP routers, SONET aggregation devices, and SONET add/drop multiplexers, to name but a few.

Even though most of the PXC ports in an opaque application are physically connected to OEOs (TNEs) through links referred to as PXC-TNE links, other types of logical links are required to provide information flow to control such a network. These links can be broken down into following categories:

1) PXC-PXC link
2) PXC-Client link
3) PXC-EXC link
4) PXC-TNE link

These links are discussed in more detail below.

2.1 PXC-PXC Link

Figure 2:
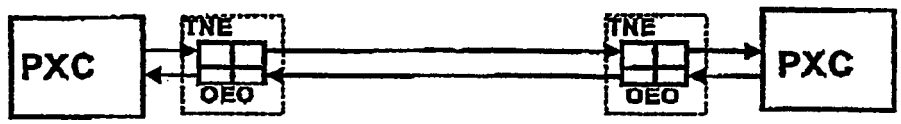
FIG. 2 shows variations of PXC-PXC links including a type 1 variation in which the TNE ports have no multiplexing capability, a type 2 variation in which the TNE ports have multiplexing capability at both ends, and a type 3 variation in which the TNE ports have multiplexing capability at one end.
Figure 2:
Figure 2:
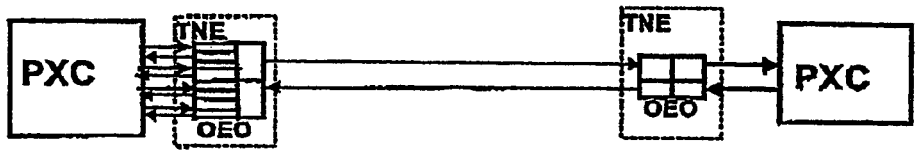

In an opaque application, PXC-PXC link is a logical bi-directional link between (bi-directional) ports of two adjacent PXC nodes. As shown in FIG. 2, each logical PXC-PXC link is a concatenation of three physical entities (PXC-TNE: TNE-TNE: TNE-PXC). The logical connectivity provided through PXC-PXC links is useful in building topology database to be utilized for routing lightpaths. The characteristics of the PXC-PXC link, in general, depends on the supported TNE-TNE link. The description of these variations, shown in FIG. 2, follows.

2.1.1 No TDM Multiplexing

In the configuration shown in FIG. 2(a), the OEO attached to the PXC is assumed to have no TDM multiplexing capability. Hence each logical PXC-PXC link will be physically mapped to each OCh link connecting two adjacent PXCs. The PXC-PXC link inherits the characteristics of the attached OEO. In opaque application, the attached OEO can be either of:

1) SONET (in)-SONET (out): In this case, the PXC-PXC link is an end-end SONET link.
2) SONET (in)-Wrapper (out): In this case, the PXC-PXC link can be logically perceived as SONET link, where the physical transmission within the WDM-WDM link is being carried out in digital wrapper format. The OEO is responsible for taking a SONET signal on the Drop side Rx port and creating a Wrapper signal to be sent out on the Line side Tx port. At the other end of the link, the OEO removes the Wrapper and transmits the SONET signal on the drop side Tx port.
3) Wrapper (in)-Wrapper (out): In this case, the PXC-PXC link is an end-end wrapper link, and therefore can be considered as protocol transparent. Wrapper overhead bytes can be used for autodiscovery, link verification, and lightpath trace monitoring. Note that a SONET signal from the Client node has to be 'wrapped' using an additional OEO between client and PXC. Such a terminal is often called an On-ramp/Off-ramp OEO.
4) SONET/Wrapper (in)-SONET/Wrapper (out): In this case, the drop and the line side of the attached OEO can be individually programmed to perform in SONET or wrapper mode. Hence, this configuration can be considered as a generalization of the variations discussed above.

Based on the length of the WDM link between adjacent PXCs, there may be a need to perform OEO regeneration. The type of regeneration required will be dependent upon the WDM transmission. For the three types of TNEs discussed above, only the first type will require a SONET (in) and SONET (out) regenerator. The rest are Wrapper regenerators.

2.1.2 TDM Multiplexing at Both Ends

In the configuration shown in FIG. 2(b), the OEO attached to the PXC is assumed to have TDM multiplexing capability. Therefore, each physical OCh link connecting two adjacent PXCs will carry multiple logical PXC-PXC links. This configuration will be relevant when PXC is used to provide agility at rates lower than the line rate, such as OC-192 add drop capability with OC-768 transmission.

This configuration can have the same variations of SONET and digital wrapper transmission as specified in section 2.1.1.

2.1.3 TDM Multiplexing at One End

In the configuration shown in FIG. 2(c), the OEO attached to one of the PXC is assumed to have TDM multiplexing capability. Hence, there will be one-to-many mapping of logical links between adjacent PXCs. This configuration will be relevant when PXC at one location is used to provide agility at sub-line rates whereas the other end is involved in cross-connecting at the line rate.

2.2 PXC-Client Link

For opaque application, the PXC-Client link may or may not require an OEO is between the client equipment and the PXC port. The presence of OEO is necessitated by the following reasons:

1) Link budget: An OEO will be necessary if the Client equipment or the network side OEO cannot handle the loss through PXC and patch panels.
2) Transparency requirement: A SONET-to-Wrapper OEO between client and PXC can provide the protocol transparency without requiring programmable OEOs on the line side. Such OEOs are referred to as On-ramp and Off-ramp cards.
3) SLA and performance monitoring: The OEO may be required to isolate the faults and do performance monitoring at the network boundaries.
4) Multiplexing: The OEO may be required to perform multiplexing at the tributary side, before performing switching at the PXC. This will happen in cases where the client ports are at sub-line rate and require no further grooming at intermediate PXC sites.
5) Protection switching: The OEO may be required to detect failures within the PXC network without requiring interworking between PXC and surrounding line systems.

Figure 3:
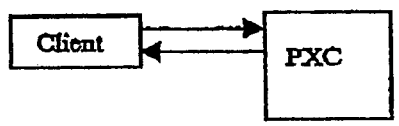
FIG. 3 shows variations of PXC-Client links including a type 1 variation in which there is no OEO between the client and the PXC, a type 2(a) variation in which there is an OEO between the client and the PXC, and type 2(b) variation in which there is a 4:1 multiplexer (mux) between the client and the PXC, and a type 3 variation in which there is a remote client.
Figure 3:
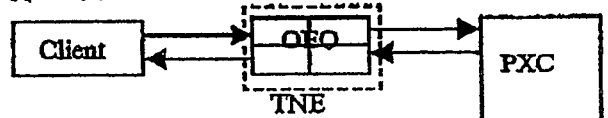
Figure 3:
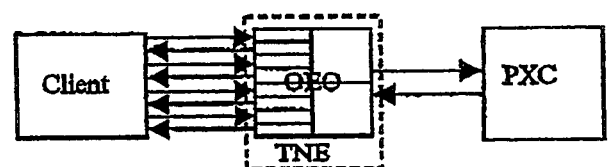
Figure 3:
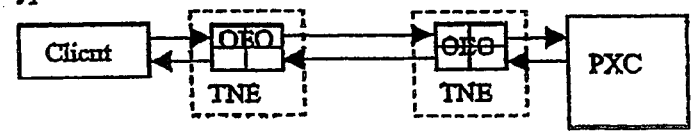

FIG. 3(a) shows an exemplary PXC-Client link with no OEO between the Client and the PXC.

FIG. 3(b) shows an exemplary PXC-Client link with an OEO between the Client and the PXC.

FIG. 3(c) shows an exemplary PXC-Client link with a 4:1 multiplexer between the Client and the PXC.

FIG. 3(d) shows an exemplary PXC-Client link with a remote Client.

2.3 PXC-EXC Link

The PXC-EXC links will be required to support hybrid network configurations, where grooming at both optical and electrical layers is required. Based on the application, the relationship between PXC and EXC can be that of a peer or a client-server. The peer relationship implies that both PXC and EXC will participate in making lightpath routing and protection switching decisions at the optical layer. On the other hand, client-server relationship between PXC and EXC implies a layered network, where the PXC provide layer-0

(optical layer) service to the EXC. For a peer relationship, the PXC-EXC link can be thought of as a PXC-PXC link, whereas for a client-server relationship, the PXC-EXC link can be considered as PXC-Client link.

In addition to the differences based on control plane architecture, other variations are possible. These are based on the interface between WDM line system and EXC, and are:
1) Integrated WDM links and the EXC interface: This is a possible interface for connectivity between EXC and WDM line system belonging to the same vendor.
2) Non-integrated: This is a possible scenario for interface between EXC and WDM line system belonging to separate vendors.

Figure 4:
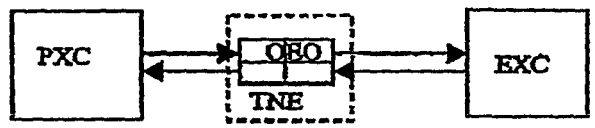
FIG. 4 shows variations of PXC-EXC links including a type 1(a) variation in which the PXC and EXC are collocated and the OEO and EXC interfaces are non-integrated, a type 1(b) variation in which the PXC and EXC are collocated and the OEO and EXC interfaces are integrated, a type 2(a) variation in which the PXC and EXC are non-collocated and the OEO and EXC interfaces are non-integrated, and the type 2(b) variation in which the PXC and EXC are non-collocated and the OEO and EXC interfaces are integrated.
Figure 4:
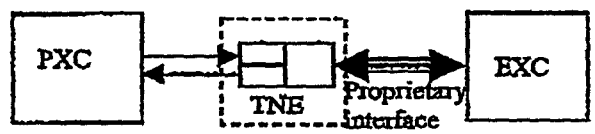
Figure 4:
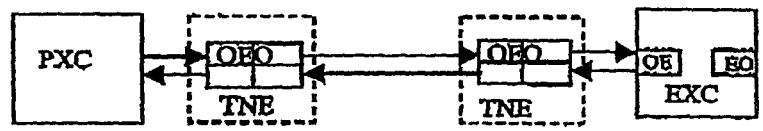
Figure 4:
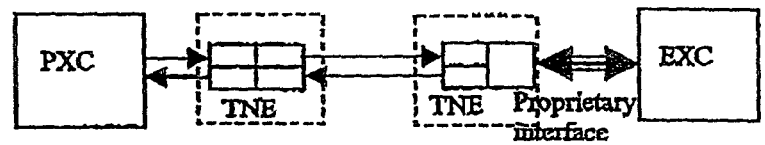

FIG. 4(a) shows an exemplary PXC-EXC link where the PXC and EXC are co-located and the OEO and EXC interfaces are non-integrated.

FIG. 4(b) shows an exemplary PXC-EXC link where the PXC and EXC are co-located and the OEO and EXC interfaces are integrated.

FIG. 4(c) shows an exemplary PXC-EXC link where the PXC and EXC are not co-located and the OEO and EXC interfaces are non-integrated.

FIG. 4(d) shows an exemplary PXC-EXC link where the PXC and EXC are not co-located and the OEO and EXC interfaces are integrated.

2.4 PXC-TNE Link

The PXC-TNE link specifies the local physical connectivity/adjacency between the PXC ports and TNE ports (OEOs). Possible variations are covered in the description of PXC-PXC link types in section 2.1, and are:
1) PXC-TNE link with no TDM multiplexing
2) PXC-TNE link—with TDM multiplexing In an opaque application, as shown in FIG. 1, the PXC is surrounded by OEOs. The presence for these OEOs is driven by many reasons, some of which are discussed in section 3. Given the presence of these OEOs, some form of interworking between PXC and these OEOs, representing line system, is required and is discussed in the section below.

2.5 Configuration of TNE Ports

In general the TNE ports (OEOs) attached to the PXC ports will require configuration for various reasons. Some reasons are:
1) LOL mode: If supported by the attached TNE, configuration may be required to switch on or off the LOL behavior of an OEO to support the desired flavor of opaque application as discussed in section 4. For example, this configuration may only be required at provisioning of TNE for an LOL everywhere scenario, whereas it may need a dynamic reconfiguration to support LOL at the end-node only (applicable to all links).
2) SONET/Wrapper mode: This may need to be configured to avoid repeated transitions between SONET and wrapper for pass thru connections (not applicable to PXC-Client link).
3) Alarm mode: For appropriate LOL behavior as well as fault localization, it may be desirable to configure the alarm reporting mode of a TNE port (applicable to all links).
4) VOA level: In the case of a long reach (LR) OEO between client and PXC, it may be required to attenuate the output signal before it is cross-connected to the line side OEO (applicable to PXC-Client link only).
5) Injection and Reporting of Test patterns in overhead bytes: In order to facilitate autodiscovery, link verification, and path trace monitoring, it is useful if the PXC can command the OEO to inject test patterns in unused overhead bytes and to report them.
6) Autoport mode: The attached OEO can be provisioned in autoport mode, whereby the TNE will not generate alarms until it has seen a good signal.
7) Distinguish between LOL and other LOS criteria (loss of transitions, etc.): This may help autodiscovery if unmodulated alignment laser is used to light a fiber.
8) Loopback OEO: If supported by attached TNE, looping back output of OEO to its input will help full verification of idle PXC-TNE links. It will also eliminate spurious alarms generated from TNE during idle state.
9) Generation of ODUk-OCI for wrapper networks: The OEO can be provisioned (through TNNI) to generate a non-AIS maintenance signal on the line before it sees a good signal from PXC port. This signal, ODUk-OCI, can be used to distinguish between idle link and failure in the middle of a link.

It should be noted that there may be a need for configuration of other parameters of TNE ports based on UNI or administrative provisioning which is not within the scope of current document.

2.6 PXC Opaque Application

In the opaque application, the optical network consists of a set of network elements that are optical switches/optical crossconnects and are linked together by point-to-point DWDM transport systems.

Note that all the switching elements need not be PXCs. Some of them may be OXCs that perform OEO conversion along the data path in the OXC. The equipment that is connected to the optical network to use the services offered are called Clients. Examples of clients include IP routers. Clients are usually connected to crossconnects, although they may also be connected directly to the WDM terminals. In this application, the DWDM links are necessarily terminated at each PXC.

Among other things, the present application addresses the issue of automatically discovering the adjacency information as well as periodically verifying that the connectivity discovered remains valid. There are two types of adjacencies of interest, namely PXC-WDM adjacencies and PXC-PXC adjacencies. These adjacencies are shown in FIG. 5.

Figure 5:
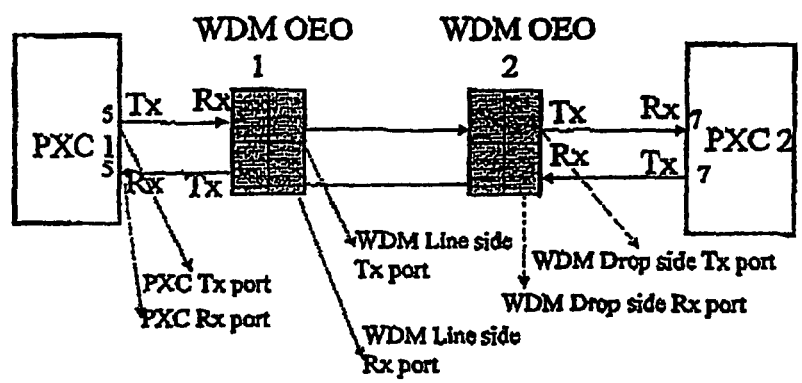
FIG. 5 shows PXC-WDM adjacencies and PXC-PXC adjacencies.

The following PXC-WDM adjacencies exist in FIG. 5:
PXC1-OEO1
PXC2-OEO2
The following PXC-PXC adjacency exists in FIG. 5:
PXC1-PXC2
For each adjacency, there are two directions of interest.
PXC-WDM adjacencies:
PXC1 Tx→OEO1 Rx
PXC1 Rx←OEO1 Tx
PXC2 Tx→OEO2 Rx
PXC2 Rx←OEO2 Tx
PXC-PXC adjacencies:
PXC1 Tx→PXC2 Rx
PXC1 Rx←PXC2 Tx
The arrow indicates the direction of the optical signal.

In addition to the port-port adjacency, it is also important to ascertain the type of optical signal that the link can carry. This can be characterized using Signal Rate and Protocol. For example, the Signal Rate may be 10 Gigabits per second and the Protocol may be SONET. It is possible that the link may be capable of supporting variable rates and protocols as well. It is assumed that the adjacency information is stored in terms of bi-directional adjacencies.

Thus, as an example, the adjacency information discovered for FIG. 5 may be written as follows:
PXC-WDM adjacencies:
(PXC1, Port 5, Tx, OEO1, Port 3, Rx, 10 Gig, SONET)

(PXC1, Port 5, Rx, OEO1, Port 3, Tx, 10 Gig, SONET)
(PXC2, Port 7, Tx, OEO2, Port 4, Rx, 10 Gig, SONET)
(PXC2, Port 7, Rx, OEO3, Port 4, Tx, 10 Gig, SONET)
PXC-PXC adjacencies:
(PXC1, Port 5, Tx, PXC2, Port 7, Rx, 10 Gig, SONET)
(PXC1, Port 5, Rx, PXC2, Port 7, Tx, 10 Gig, SONET)

Since the PXC devices are All-optical switches, they does not have direct access to the bits in the incoming signal. They also do not have the capability of injecting a light signal by itself into the WDM OEO equipment. However, they may use test equipment to receive and transmit valid signals that will aid in the autodiscovery process. The test equipment may be considered internal to the PXC equipment. It is possible to use spare WDM OEO as test equipment. This is discussed in a separate section.

The ADP requires a signaling protocol between the PXC and attached WDM equipment as well as between adjacent PXC nodes. In-band signaling is difficult to use as the PXC has no easy access to the bits in the optical signal.

The signaling protocol between a PXC and the attached WDM equipment may therefore use an Out-of-Band (OOB) signaling protocol. For the purposes of this discussion, this protocol will be called TNNI. The signaling protocol between a PXC and an adjacent PXC may also use an Out-of-Band (OOB) signaling protocol. For the purpose of this paper, this protocol will be called XNNI.

The ADP on the PXC and the WDM equipment will use the TNNI protocol to communicate with one another.

2.7 PXC All-Optical Application

Figure 6:
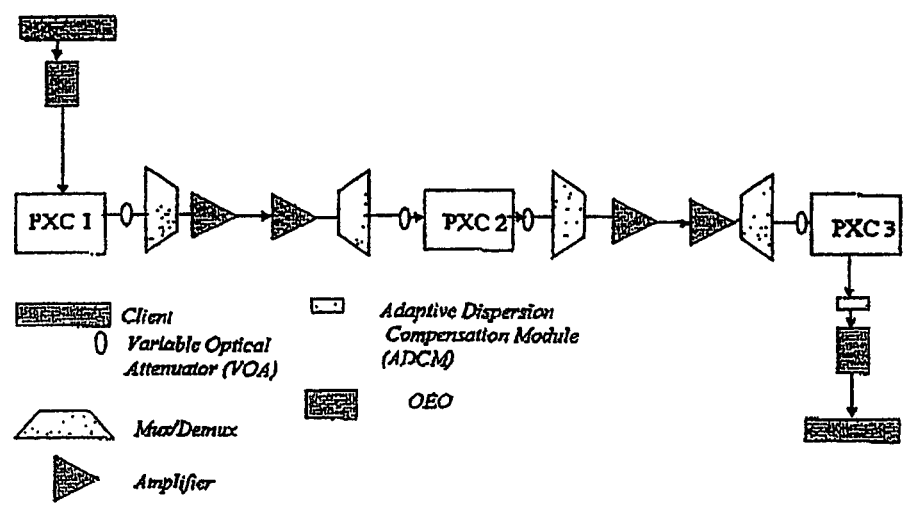
FIG. 6 shows an exemplary all-optical application in which there are two types of PXC-WDM links, specifically All-optical links where the WDM equipment attached to the PXC is not an OEO device and Terminal links where the WDM equipment attached to the PXC is a WDM OEO transponder as in the opaque application.

In the all-optical application, the DWDM signal is not necessarily terminated at a PXC. With reference to FIG. 6, there are two types of PXC-WDM links, specifically All-optical links where the WDM equipment attached to the PXC is not an OEO device and Terminal links where the WDM equipment attached to the PXC is a WDM OEO transponder as in the opaque application. There are also two types of PXC-PXC links, specifically All-optical links that do not have OEO devices on the data path and Semi-Opaque links that have WDM OEO transponders at one end of the link.

3 Autodiscovery and Link Verification 3.1 Problems Addressed

This disclosure covers the following problems and provides various solutions:

1) Discovery of PXC-WDM links in the Opaque and All-Optical application. This refers to the automatic discovery of links between a PXC and surrounding WDM equipment. In the Opaque application, the WDM equipment adjacent to a PXC port is a WDM OEO (transponder). In the All-optical application, the WDM equipment adjacent to a PXC port could be a WDM OEO or some other device such as a VOA or a Mux/Demux port.
2) Idle link verification of PXC-WDM links in the Opaque and All-Optical application. It is necessary to verify that PXC-WDM links that are not carrying live traffic currently are capable of carrying traffic when called upon to do so. To that end, optical connectivity between the PXC ports and attached WDM equipment should be continuously or at least periodically verified. Continuous verification of a link is difficult if there is no light source at the end of the link as in the PXC Tx→WDM Rx case.
3) Discovery of PXC-PXC links in the Opaque and All-Optical application. This refers to the automatic discovery of links between neighboring PXC nodes. In FIG. 2 above, there is a bi-directional link between port 5 of PXC1 and port 7 of PXC2. This link may be directly discovered with or without the aid of the WDM equipment that is part of the link.
4) Idle link verification of PXC-PXC links in the Opaque and All-Optical application. A PXC-PXC link may be idle because it is unallocated for traffic or it is reserved to be used in case of a protection switch. Therefore, it is important to keep monitoring the connectivity and the health of an idle PXC-PXC link so as to guarantee high levels of availability in the optical network. It is desirable to have the link monitored constantly. In case that is infeasible, at the very least, periodic verification of the link is essential.

3.2 Autodiscovery Process

The ADP is controlled and coordinated by the PXC nodes. The communication between a PXC node and adjacent WDM equipment nodes is carried out via an Out-of-Band signaling protocol called TNNI. The communication between neighboring PXC nodes is carried out with an out of band signaling protocol called XNNI. The PXC nodes are also responsible for controlling the behavior of the test equipment participating in the process. Note that it is possible to use spare WDM equipment as test equipment, and, in that case, it is controlled via TNNI.

The ADP has three parts. There is the component that resides on the PXC and is responsible for coordination and control of autodiscovery and link verification. Then there is a component that runs on the WDM equipment. This is responsible for controlling the behavior of the WDM equipment and perhaps the test equipment. There is also a component in the PXC node that controls the resource reservation issues with respect to the test equipment.

Aside from the state machines that are part of the protocols, there is a 'driver' process that runs the state machines on the PXC nodes and is responsible for initialization, resource allocation, synchronization, and other functions.

Initialization of ADP consists of the following steps:

1) Read the PXC Topology database and build a candidate list of PXC ports whose adjacencies to discover and verify.
2) For each member of this candidate list, initialize the state machine according to the protocol.
3) For every WDM node adjacent to the PX, get the MappingTable via TNNI. This provides the list of candidate WDM ports whose adjacencies should be discovered.
4) For every adjacent PXC node, get the Mapping Table via XNNI. This provides the list of candidate PXC ports on neighboring PXC nodes, same of whose ports may be connected to local PXC ports via a common WDM link.

3.3 Assumptions

The following assumptions are made:

1) The signaling between the PXC nodes and adjacent WDM equipment can be accomplished by a protocol which, for the sake of this disclosure, is called TNNI.
2) The signaling between the PXC nodes can be accomplished by a protocol which, for the sake of this disclosure, is called XNNI.
3) It is assumed that Test messages can be sent using overhead bytes in the data stream. For example, Section Trace J0 bytes may be used for a data path carrying SONET OC192 data. There is no assumption as to exactly what bytes are used, but just that some bytes are available.
4) It is assumed that every entity that needs to be discovered has associated with it an identity pattern that is unique in the network. It is also assumed that the mapping between the identity pattern and the identifier used to address the entity is known to the entity.
5) Test equipment is assumed to be available that meets the individual requirements of the various embodiments described herein. For example, some embodiments require that the test equipment report the identity pattern received on certain overhead bytes, and some embodiments require that the test equipment generate a pilot tone. Other test equipment requirements are discussed.

4 Autodiscovery and Link Verification Embodiments

4.1 Test Equipment

Figure 7:
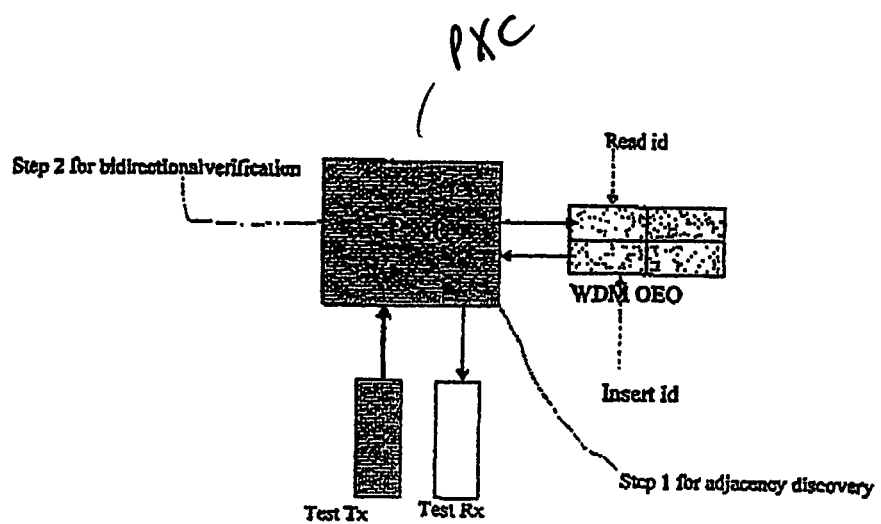
FIG. 7 shows test equipment attached to dedicated test access ports of the PXC and considered internal to the PXC node, in accordance with an embodiment of the present invention.

It is proposed that test equipment (Test Tx, Test Rx) be shared across all PXC ports that need to be discovered. In particular, the following options are noted:

1) The test equipment may be spare WDM Tx and Rx ports on the WDM line system and the ADP will use TNNI to communicate with the test equipment as it does with the other WDM ports.
2) The test equipment may be attached to dedicated test access ports of the PXC and considered internal to the PXC node, as shown in FIG. 7.

4.2 Fast Autodiscovery of PXC-OEO Links.

This is applicable in the Opaque application as well as the terminal sites in the All-Optical application of the PXC.

Several methods are outlined below. The descriptions below assume that discovery of adjacencies of PXC and WDM OEO nodes has already been carried out. A trial and error procedure may be necessary to discover the correct signal rate and protocol. The procedures below assume that the correct signal rate and protocol have been identified.

4.2.1 Proposal 1:

This proposal has two phases. A first phase discovers the unidirectional adjacency associated with a candidate PXC Rx port. Discovery is said to have completed if the first phase is successful. A second phase verifies bi-directional connectivity and is carried out immediately after a successful first phase.

The two phases are carried out for all candidate PXC ports whose adjacencies need to be discovered.

Initialization:

6) All the candidate WDM Drop side Tx lasers are turned on. In order to accomplish this, the ADP on the PXC informs the candidate WDM Tx ports, via TNNI, to turn their lasers on.
7) For each WDM Tx and Test Tx, there is a system wide unique Identity Pattern. This pattern may be carried out in band overhead bytes (For example, Sonet Section Trace J0 bytes). The Test Rx and WDM Rx will report the Identity pattern received in the incoming signal, upon demand.
8) A candidate WDM OEO Drop side Tx, upon power on, sends out its Identity pattern (using the above mentioned overhead bytes). It is said to be in Insert mode. In Passthrough mode, the WDM Drop side Tx transparently transmits whatever the WDM Line side Rx port receives.
9) The WDM nodes adjacent to the PXC send, via TNNI, a Mapping Table that maps the Identity pattern associated with the WDM Drop side Tx port along with the system wide identifiers of the four associated ports—the WDM Drop side and Line side Tx and Rx ports. The ADP at the PXC builds a list of candidate PXC ports and WDM ports whose adjacencies need to be discovered.

Phase 1 consists of the following steps:
For each candidate PXC port do the following:
1) Ensure that the candidate PXC Rx port whose adjacency needs to be discovered is receiving light.
2) Reserve a Test Rx.
3) Crossconnect the PXC port to the known test receiver port.
4) Autodiscovery process asks the test receiver to report the Identity message it sees.
5) The Test receiver reports the Identity message to the ADP.
6) The PXC maps the Identity message to WDM Tx port id and WDM Node id.
7) The PXC infers the bi-directional mapping of WDM port to PXC port, based on Mapping Table information, in case of a successful step 4.
8) Delete the crossconnection.
9) Release the Test Rx resource.
10) Send message to switch the WDM Tx to Passthrough mode.
11) Receive acknowledgement from WDM Tx.

Phase 2 consists of the following steps:
For each PXC port mapped in Phase 1 do:
1) Reserve Test Tx.
2) Crossconnect PXC port to the known Test Tx. Suppose that in the previous phase we discovered (PXC port j, WDM Node id, WDM port id) mapping.
3) Send TNNI message to the WDM Rx port (inferred after Phase 1) to match the Identity pattern it sees with the Identity pattern of the Test Tx.
4) The WDM Rx reports match or mismatch.
5) Delete the crossconnection.
6) Release the Test TX resource.

Note that some of the steps can be carried out in parallel.

The following alternate proposals are variations on the above proposal. Some of the basic steps, such as Reserve Test Tx, Release Test Tx, Delete crossconnection, are in common and not described fully for every one of the following proposals.

4.2.2 Proposal 2:

As part of initialization, the mapping table is sent by the WDM controller to the ADP on the PXC via TNNI. Crossconnect the Test Tx to a candidate PXC port. All undiscovered WDM Rx ports are commanded to monitor for the Test Tx Identity pattern. When there is a match, the WDM Rx port reports it via TNNI. The PXC Tx-WDM Rx link is now discovered. From the mapping table, the WDM Tx-PXC Rx mapping can also be inferred. Repeat this process for all candidate PXC ports until all ports are discovered. To verify the WDM Tx→PXC Rx adjacency that was inferred from the above process, the ADP commands a WDM Tx port via TNNI to turn on and off its laser. The PXC port will detect the presence of light and loss of light at the PXC Rx port that is attached to the WDM Tx port. In this way, that particular adjacency is verified. This is to be carried out serially for all the adjacencies inferred above.

4.2.3 Proposal 3:

Same as proposal 2, except the verification step is carried out as follows:

The PXC Tx-WDM Rx link is verified by looping back the PXC bi-directional port to connect the WDM Drop side Tx port to the WDM Drop side Rx port. The WDM Rx would then switch from a LOS state to some other state (such as AIS). The WDM Tx will automatically send out a defect notification as part of the TNNI protocol. The TNNI defect notification that informs the ADP of a transition from LOS to AIS would confirm that the link is good.

4.2.4 Proposal 4:

This proposal uses a different scheme to discover the PXC Tx→WDM Rx adjacency. The assumption is that Test Tx emits enough light so that the WDM Rx will detect that a loss of light condition is no longer present. It may not see a valid digital signal, but that is acceptable. So the Test Tx could be a simple broadband laser. The WDM Rx will report via TNNI a change in status from Presence of Light to Loss of Light and vice versa. The steps are as follows:
1) For a candidate PXC port, crossconnect the Test Tx to the PXC port.
2) Over TNNI, at most one WDM port will report a transition from LOL condition to Presence of Light condition. It also reports its identifier as well as the identifier of the matching WDM Tx and Rx ports.
3) From this; the PXC bi-directional port to WDM bi-directional port mapping is inferred. If no report is received, then move to Step 5.
4) The WDM Tx→PXC Rx adjacency is verified using any of the methods outlined above.
5) Repeat this for another candidate PXC port until there are no more candidate PXC ports remaining.

4.2.5 Proposal 5:

This is similar to the previous proposal except that the Presence of light—Loss of light transition is used to detect the WDM Tx→PXC Rx adjacency.

Discover a WDM drop side Tx as follows: by default, all WDM Tx are on emitting light. Pick a WDM Tx whose adjacency we want to discover. Via TNNI, command it to turn off its laser. Exactly one PXC Rx port would notice loss of light condition. Thus, the WDM Tx→PXC Rx link is discovered.

Any of the above schemes can be used to verify the PXC Tx→WDM Rx adjacency.

4.2.6 Proposal 6:

The previous two proposals use the idea of turning light on and off and getting event reports about the Loss of light—Presence of light transitions to discover adjacencies. This proposal uses the same basic idea, but enables N adjacencies to be discovered in $1+\log\_2 N$ steps.

First, suppose that there are N WDM ports that need to be mapped to N PXC ports. Write N in binary as a sequence of at most $1+\log\_2 N$ bits. Map these N sequences arbitrarily to the N WDM ports. Assign this mapping to the WDM ports via TNNI.

Then, via TNNI, the N WDM Tx are commanded to turn on and off their laser according to the pattern assigned to it. For a 1 bit, the laser is kept on for A seconds, for a 0 bit the laser is off for B seconds. Appropriate values for A and B chosen, and defaulted to 1 second.

The optical detectors attached to the PXC Rx ports monitor the pattern received at each port. From this, the binary sequence is rebuilt. From the above assignment, the WDM port identifier is inferred as is the WDM Tx→PXC Rx adjacency.

Any of the above schemes can be used to verify the PXC Tx→WDM Rx adjacency.

Modification 1: This procedure requires synchronization of all the lasers changing state at the same time. To alleviate this problem, we can prefix the pattern with a fixed length known sequence (say, 10 alternating 0 and 1 bits) so that the pattern can be correctly identified.

Modification 2: Furthermore, the WDM Tx repeats turning on and off the laser according to the modified pattern (original pattern|prefix bits) until it is commanded by the ADP via TNNI to stop transmitting because the adjacency has been mapped. This allows the ADP to make the mapping process more robust to average out possible errors.

Modifcation 3: Instead of using a long string of prefix bits, replace a 1 bit in the pattern with the string 10, the 0 bit with the string 01, and the prefix string is always is set to be 1100.

Modification 4: A problem with the pattern assignment described in Modification 3 is that it needs guard bits to ensure that a 0001 pattern does not get confused with a 0010 pattern. Now, we suggest that a scheme for pattern assignment be used so that the N patterns are such that cyclical shifts of a pattern do not result in another of the N assigned patterns. In that way, guard patterns are not necessary.

4.2.7 Proposal 7:

This proposal provides a fast way to discover the adjacencies. The entire process can be accomplished in roughly $1+\log\_2 N$ steps, where N is the number of adjacencies to be discovered. The key idea is to add the WDM Receivers on ports that are already discovered to a pool of available receivers that can be used in the next step of autodiscovery.

Assume that the WDM Transmitters are programmed to send out an Identity pattern unique to the WDM Tx using overhead bytes (Sonet J0, Wrapper overhead, etc.). Initially, the Available pool of Receivers is the Test Rx attached to a known PXC port.
1) As in Method 1, use a Test Rx to discover a single WDM Tx. This can be accomplished in one step by crossconnecting only to a PXC port that is reporting that it is seeing light at the port. The Test Rx reports the pattern it sees and an adjacency is discovered. From this, the PXC Tx→WDM Rx mapping is inferred. The mapping can be verified one of the methods mentioned above. Now, add the WDM Rx to the Available pool of Receivers.
2) Crossconnect two candidate PXC ports to the two WDM Rx in the Available pool. Upon reading the patterns, two more adjacencies can be inferred. Add the WDM RX to the Available pool of Receivers. Now, there are four Receivers in the Available pool.
3) Crossconnect four candidate PXC ports to the four WDM Rx in the Available pool. Upon reading the patterns, four more adjacencies can be inferred. Now, there are eight Receivers in the Available pool.
4) Continue on in this way doubling the Available pool after each step.
5) At the end, all N WDM OEOs are discovered within $1+\log\_2 N$ steps.

4.3 Autodiscovery of PXC-WDM Links in the All-Optical Application

We propose the following novel methods to discover PXC-WDM links when the WDM link is not terminated by a WDM OEO device at the PXC. In the model below, it is assumed that the WDM ports that are adjacent to PXC ports have Variable Optical Attenuators (VOA) and Pilot tone Receivers on them.

4.3.1 Method 1

Figure 8:
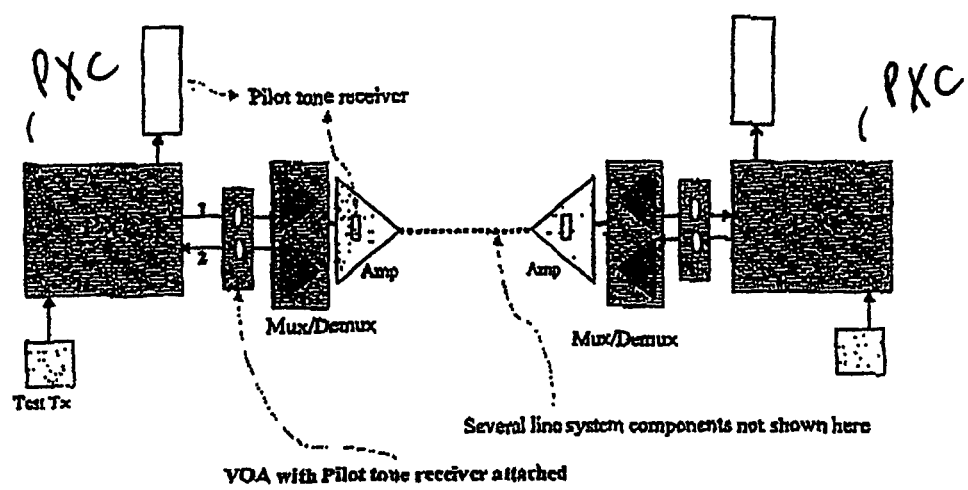
FIG. 8 shows a VOA with attached pilot tone receiver situated between the PXC and the multiplexer/demultiplexer in accordance with an embodiment of the present invention.

This case deals with discovering the adjacencies labeled 1 and 2 in FIG. 8.

Adjacency 1: PXC to WDM: Crossconnect a Test Tx to candidate PXC port. The Test Tx is tuned to emit light at a wavelength outside the range used by the WDM system (for example, 1310 nm or a wavelength in the 1550 nm range that is not used by the WDM system). The signal need not be modulated at all. The Pilot tone Rx attached to the VOA at the WDM port adjacent to the candidate PXC port detects some power at that wavelength and reports to the PXC via the TNNI interface. The adjacencies are discovered sequentially by cycling through all the candidate PXC ports.

Adjacency 2: WDM to PXC: Use the Amplified Spontaneous Emission (ASE) noise from the Amplifier adjacent to the Demux. The assumption is that there is enough noise that can result from the ASE so that the PXC port can detect it. The VOAs attached to the Demux are all set to shut out the ASE. Then, one by one, a VOA, is turned on and off. The PXC Rx port notices Presence of Light when the VOA is turned on. Note that the coordination and control of VOAs is accomplished via the TNNI interface.

Figure 9:
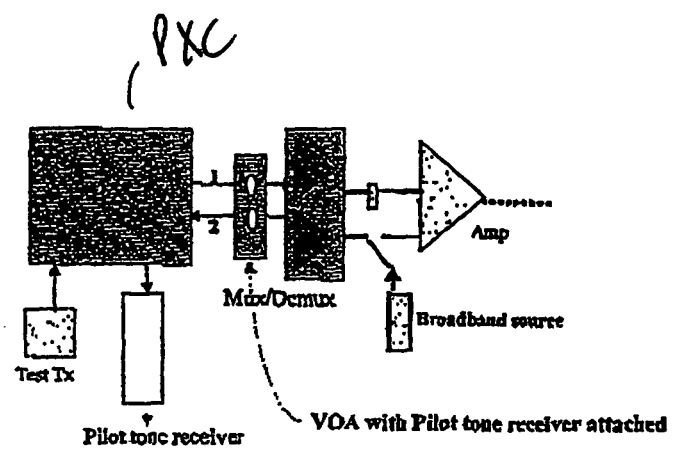
FIG. 9 shows a variation of FIG. 8 in which a broadband source is switched in behind the demultiplexer, in accordance with an embodiment of the present invention.

Modification 1: The light source used to discover adjacency 2 is the ASE from the amplifier. Alternatively, one could switch in a broadband source behind the demux as shown in FIG. 9.

Modification 2: If the WDM equipment supports a loopback of an incoming signal, that means that the signal coming in on the PXC→WDM link is looped back at the WDM port along the WDM→PXC link without the signal entering the Mux/Demux. We can then crossconnect a Test receiver to the known PXC port and verify the connectivity.

4.3.2 Method 2:

Adjacency 1: The Test Tx in this case sends a signal modulated by Pilot tone. The Pilot tone receivers on the WDM system that are adjacent to the PXC report the tone they are receiving. From this information, the PXC-WDM adjacency can be inferred. By cycling through all the candidate PXC ports, all the adjacencies can be inferred.

Adjacency 2: The WDM→PXC adjacency inferred after the above process can be verified using one of the methods mentioned earlier.

4.4 Autodiscovery of PXC-PXC Links in the Opaque Application 4.4.1 Method 1:

The PXC-WDM links are discovered using one of the methods outlined above. In order to obtain the connectivity between PXC ports of adjacent PXC nodes (PXC1 Port 5-PXC2 Port 7 in FIG. 5), the association between the WDM ports that terminate the WDM channel attached to the PXC ports (WDM OEO 1 port 3-WDM OEO 2 Port 4 in FIG. 5) should be known. It is assumed in this method that the WDM line system knows this association and will report it to the PXC nodes (PXC1 and PXC2) via TNNI signaling.

The PXC nodes put the two pieces together to discover the PXC-PXC link. The two PXCs confirm by exchanging the information over XNNI.

4.4.2 Method 2:

The following assumptions are made:
1) The WDM Line side Tx on WDM OEOs adjacent to a PXC can insert an Identity pattern (unique id into Sonet J0 or other overhead).
2) The Line side Rx on WDM OEOs adjacent to a PXC can report the Identity pattern seen on the incoming signal.
3) Local mapping of PXC-WDM ports has been carried out.

The following steps are used to discover the links between two PXCs (say PXC A and PXC B):
1) Poll all the long reach Rx on WDM OEOs adjacent to PXC for the Identity pattern seen. The messaging is via TNNI. This can be done in parallel for all OEO ports.
2) For each valid Identity pattern seen, compute the WDM OEO Node identifier as well as the Port identifier.
3) Via XNNI signaling, report the Tx identifier that is seen to the source TNE. Report also the PXC port mapped to the corresponding long reach Rx port.
4) PXC infers the PXC port-PXC port links from the PXC-PXC messages and known local port mappings.

4.5 PXC-PXC Autodiscovery for an All-Optical Link

Consider a locally mapped PXC port. Inject a signal on the appropriate wavelength by crossconnecting a pilot tone Tx to this PXC port. On the remote end, look for presence of light on the candidate PXC ports. Wherever there is light, crossconnect a pilot tone Rx and recognize the tone. Note that we need enough tones to separate the pilot tone Tx's. Also, the signal should be strong enough so that the pilot tone Rx will recognize the tone, but weak enough so that it does not interfere with the channels that are already carrying traffic.

4.6 Idle Link Verification of a PXC-PXC Link

The purpose of this invention is to automatically find out whether a link between PXCs, carried over an opaque WDM channel or over an all-optical channel, can be made operational if needed. This is needed for links that do not carry traffic and are ready to be part of a new connection or for shared protection links that have to be ready in case a working path fails. Without idle link verification, silent failures are possible. Idle link verification checks that the following elements are functional:
2. The PXC port.
3. The mirrors and data path associated with the port inside the PXC.
4. The line system port (WDM OEO or all-optical).
5. The data path from the line system port to the remote line system port.
6. The data path from the PXC to the line system port on both sides of the link.

Figure 10:
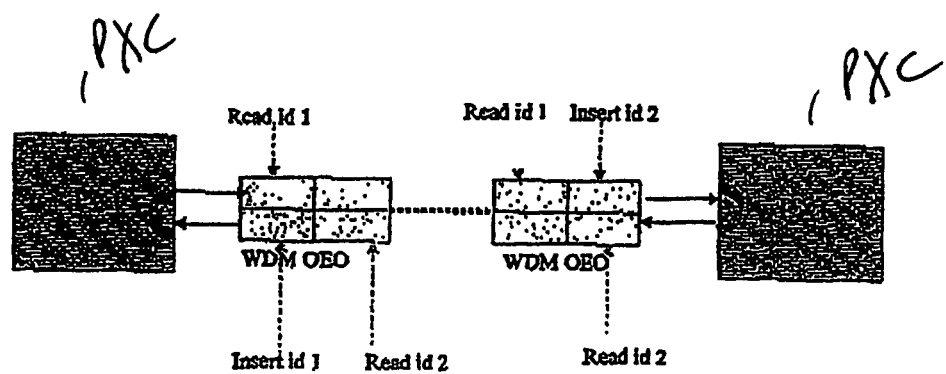
FIG. 10 shows a loopback configuration for verifying a link in accordance with an embodiment of the present invention.

The following methods are proposed for achieving idle link verification:
1) Opaque application only: Looping back the incoming signal from the WDM Tx port onto the same WDM Rx port at the PXC by creating a crossconnect of the PXC bi-directional port to itself. This allows for the WDM OEO to check that its drop-side signal is good and that the data path through the PXC is working. It also eliminates alarms on the WDM OEO. In order to verify the connectivity, the WDM drop side Tx port inserts its Identity pattern into the signal. This is then verified by the other WDM Rx ports along the path as shown in FIG. 10. The coordination of this procedure occurs via the XNNI protocol that runs between PXC nodes.
2) It is possible that Optical line systems may not prefer supporting closed loops as shown in FIG. 10 in their system. In order to prevent that from happening, we can modify the procedure described above by looping back one end of the PXC-PXC link and the other end in an alternating fashion so as to not create a closed loop at any time. The coordination and control of this process takes place via the XNNI protocol.
3) This method involves periodically connecting a Test Tx to a PXC port and signaling to the remote PXC via XNNI to connect a test receiver to the PXC port at the other end of the PXC-PXC link to check if the signal received is good. This will work for the opaque as well as the all-optical application. The Test Tx may be programmed to send its Identity pattern in the signal and the Test Rx can verify that it is seeing the same Identity pattern. In the case of the all-optical link, the Test Tx can send a signal modulated by pilot tone and the Test Rx can verify the tone received.
4) Verification of a link that is opaque at one end and not opaque at one end can be accomplished using Method 1 and Method 3 in this section. Note that in the case of Method 1 here, there is only one WDM drop side Tx that will insert its Identity pattern into the signal.

4.7 Idle Link Verification of PXC-WDM OEO Link

Method 1: Loop back the PXC port (crossconnect the Tx port to the Rx port at the PXC) so that the WDM OEO Rx receives the signal sent by the WDM OEO Tx. The WDM Tx inserts its Identity pattern into the signal and the WDM Rx confirms seeing the same Identity pattern in the incoming signal.

Method 2: Crossconnect a Test Tx to the PXC port. The verification can be accomplished using one of two techniques: a) WDM OEO Rx reports via TNNI that it is seeing a valid signal. b) WDM OEO Rx is told to look for the Identity pattern in the incoming signal. When the match is found, the WDM OEO reports it via TNNI. For the WDM OEO Tx→PXC link, crossconnect a Test Rx to the PXC port and verify that the WDM Tx Identity pattern is seen in the incoming signal.

Method 3: Optical connectivity in the WDM Tx→PXC Rx direction can be continuously verified if the following are true: a) The WDM drop side Tx laser is on if the link is idle; and b) The PXC port can detect Loss of Light condition. Optical connectivity in the PXC Tx→WDM Rx direction can be verified as in Proposal 3 of Section 4.2.3. To recapitulate, crossconnect a Test Tx to the PXC port. The WDM Rx port reports via TNNI that it has noticed a transition from Loss of Light condition to Presence of Light.

4.8 PXC-PXC Idle Link Verification for an All Optical Link

Use tunable Test Tx. Tune to appropriate wavelength and low enough signal power so as not to disrupt the live channels on the WDM link. Modulate signal with pilot tone. Crossconnect Pilot tone Rx at the remote PXC and verify the tone received.

Alternatively, instead of using a Pilot tone Rx, simply verify that the PXC port is seeing light. Since it is behind a Demux, it will see light only if the WDM link is good for the appropriate wavelength.

5 Interface Issues

PXCs, in general, introduce some loss in the process of switching the signal from an input to the output port. The loss can be attributed to two major sources:

1) coupling loss due to connectors, collimators, and imperfections of reflective surfaces.
2) loss introduce by various passive components within the optical path, such as splitters, switches, couplers (for optical monitoring), etc.

The optical signal loss can be traded off by various simplifications in the architecture of the PXC. However, there is some minimum loss, driven by the physical properties of optical signal transmission through fibers and free space, which cannot be eliminated through design options. Among other reasons, presence of OEOs around PXC within opaque architecture is driven by the need to compensate for loss through the PXC switch core. Hence, the optical interfaces at the Client equipment and the WDM line equipment should be such that they can accommodate around 10 dB insertion loss through the PXC node. They should also accommodate up to 2-3 dB attenuation due to any patch panels along the path. Since standard short reach (SR) interfaces cannot accommodate about 12 dB of loss, there is a need for hotter transmitter and/or more sensitive receivers than SR interface. Presently, the loss can be met by IR or LR interfaces, and in the future by 12 dB-VSR interfaces.

In addition to loss, some other restrictions are imposed on the optical interfaces connected to the PXC ports. Some restrictions include receiver clock recovery time and jitter. The presence of PXC in an optical network is driven by the need to provide agility at the lambda (or band) level. The agility inherently demands a quick receiver clock recovery on the optical interfaces in the event of a reconfiguration of the network due to protection switching. Similarly, presence of OEOs surrounding a PXC can introduce additional jitter within the transmitted signal, especially in the cases when such OEOs are interfacing two different signal transmission schemes such as SONET and digital wrapper. Since WDM optical transmission is very sensitive to such impairments, optical interfaces should adhere to strict jitter control to minimize the impact on WDM link engineering.

In addition to fast reconfiguration, one of the key value propositions of PXC within an optical network is network protection. In general, PXC driven network protection is required to efficiently allocate resources to the working and protection entities within a network at the optical layer. In this role, PXC will require notification of failure events within the network. Even though some of the events can be detected through internal optical signal monitoring within a PXC, a comprehensive protection switching scheme requires additional defect indications, mostly available through OEOs within a SONET or digital wrapper network. In the absence of a signaling interface between PXC and surrounding WDM line systems, some of the required functionality for protection switching can be achieved through provisioning appropriate behavior of the optical interface of the surrounding OEOs. Some of these behaviors are discussed in the section below.

6 LOS Behaviors of the WDM Line Systems

By LOS behavior of a WDM line system, we refer to the behavior of an OEO (TNE) upon seeing an LOS or AIS condition on an incoming signal. The LOS behavior of the attached OEO will influence the way the PXC can detect and isolate the failures within the optical network. Hence, it is an important element of the physical layer interoperability between PXC and the WDM line systems.

We propose several types of LOS behavior for a WDM line system. It is possible that for a lightpath, different segments of the lightpath may have different LOS behavior on the OCh links. We only consider the case where the LOS behavior is the same for all links on a given lightpath.

For the rest of this section, it is assumed that XNNI (an out of band signaling protocol) is enabled between adjacent PXC nodes. This protocol enables exchange of control and possibly defect information between adjacent PXCs. Besides XNNI, another signaling protocol, between PXC and WDM line system, denoted as TNNI, is also part of opaque architecture shown in FIG. 1. Based on the permissible delay of specific information flowing across this interface, TNNI can be classified into "Fast" and "Slow" components. In this respect, Fast-TNNI is required for information that is in series with the protection switching decisions, such as defect indications. Some other information, which is required for provisioning of appropriate OEO behavior (from PXC to TNE) or failure isolation (from TNE to PXC) is not required in real time and can be supported through a Slow-TNNI interface. To avoid any confusion, in this document, we will use TNNI to refer to the fast component of TNNI interface and use OPI (OEO Provisioning Interface) to refer to the slow TNNI. It should be noted that there are no real time constraints with OPI and it can be supported through traditional management interfaces such as TU/1.

There is an alternative to OPI, where, if allowed, the PXC can provision some behaviors within the attached OEOs through NMS. However, for the type of information that needs to be provisioned through OPI, we can assume that going through NMS will not serve the purpose (as there may be huge amount of delays involved in going through north bound and south bound interfaces to and from NMS and such interfaces are not required to be online all of the time).

6.1 SONET Network

We first consider the case of a SONET only network. The discussion is also valid for an SDH network. In the next subsection, we consider a Digital Wrapper based network.

For the rest of this section, we will consider the following types of failure conditions:

1) IRS. This condition can arise from Loss of transitions, Loss of light, Loss of frame, High BER, and other conditions. It does not include an AIS condition.

2) AIS. In most of the cases, AIS is generated by a node after an IRS is detected. In the case of SONET, we are interested in Line AIS (AIS-L) condition.

In SONET network, both IRS and AIS are mapped to Signal Fail (SF) condition for automatic protection switching (APS) purposes.

The behavior types are classified depending upon what an OEO does upon receiving an IRS or AIS. It can transform incoming IRS or AIS to LOL, LOT, or AIS. LOL stands for Loss of Light, which means turning off the output laser. LOT stands for Loss of Transitions, which means keeping the output laser on without any transitions (i.e., generating unmodulated output).

Figure 11:
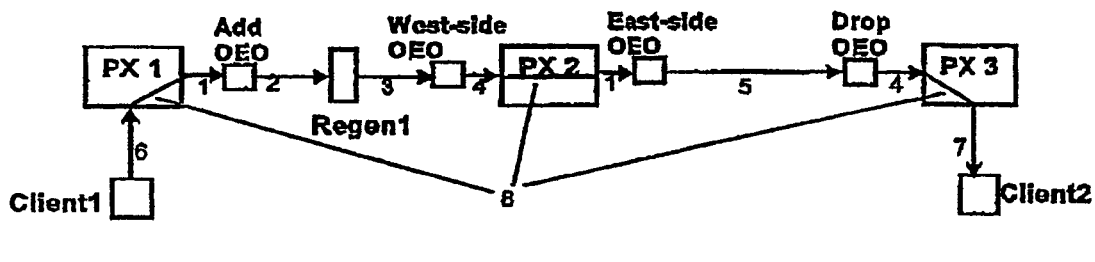
FIG. 11 shows an exemplary optical communication system identifying various possible failure locations.

The following failure types are classified and numbered as shown in FIG. 11:

1: Failure of. PXC Tx→OEO Rx link
2: Failure of OEO Tx→Regen Rx link (or Regen Tx→Regen Rx link)
3: Failure of Regen Tx→OEO Rx link
4: Failure of OEO Tx→PXC Rx link
5: Failure of OEO Tx→OEO Rx link
6: Failure of Client Tx→PXC Rx link
7: Failure of PXC Tx→Client Rx link
8: Failure of PXC cross-connection Note: Equipment failures are lumped with the corresponding link failures.

In the following discussion, one direction of lightpath is considered. Note that this is not a simplification.

The main types of LOS behavior are:

1) Type 1 - LOL everywhere
2) Type 2 - LOL at End node only
3) Type 3 - LOL at the failure point, AIS elsewhere
4) Type 4 - LOL at failure point, LOL at end node
5) Type 5 - Differentiated AIS everywhere In addition to these, we have a solution without imposing any special LOS behavior on the WDM line system. We categorize that as Type 6—TNNI only. This requires the WDM equipment to implement the TNNI protocol, which uses Out of Band signaling, between the TNE and the adjacent PXC node.

6) Type 6 - TNNI everywhere

We also discuss four solutions for an opaque network that do not require any special behavior on the part of the WDM line systems. All the modifications necessary are internal to the PXC system. They are as follows:

7) Type 7 - OEO at Add/Drop port
8) Type 8 - OEO at Drop port
9) Type 9 - AIS taps
10) Type 10 - Receiver at Drop port, The following issues are considered for each of the solutions:

1) Failure forwarding: Refers to the transport of defect indication from the point of detection to the node where the protection switching decision is made. Since in a PXC network, the protection switching decision is performed by an end-node, it is required that the defect indication is passed on to the end-node, if it cannot detect the failure condition autonomously. Hence in some of the LOS scenarios discussed below, where the end node cannot detect the failures either through internal LOL or through some of the other in-skin techniques described later, an explicit indication will be required either through the adjacent TNE or an out of band failure forwarding through XNNI.

2) Alarms: Refers to the ability of a given architecture to not generate or to be able to suppress undesirable alarms. It is important to avoid generating spurious alarms at the NMS. Some of the schemes outlined below will lead to the WDM line system and/or PXC nodes generating spurious alarms at the event of an upstream failure. This can lead to event storms and cause a lot of confusion to the operator. In addition to link or node failures, there may be other sources that lead to spurious alarms, such as idle link verification. In each of the scenarios, we will identify if there can be more than one contributor to undesirable alarms.

3) Provisioning: Refers to sending appropriate configuration information from PXC to the attached OEO to be able to interoperate in a given optical network Such information may be required to enforce a particular LOS behavior from the attached OEO. In some cases, such provisioning will be required only when the equipment is being put in service, however, in other situations, dynamic provisioning on a per lightpath basis may be needed. In each of the scenarios discussed below, we will identify the extent of provisioning required. As described earlier, the provisioning information is not required to be dealt with in real-time by the WDM line system, hence even the dynamic provisioning can be supported through OPI (slow TNNI instead of fast TNNI).

4) Failure Isolation: Refers to the process of identifying the source of failure based on the defect indications received by PXC nodes along a given lightpath. Since the control plane (either centralized using an NMS or distributed as in G.ASTN) needs to have an accurate view of all the links in the network and their status in order to make accurate routing decisions, the failure isolation is required to update the link state database, which indicates the status of a link to be either UP or DOWN. In most of the cases, the failure isolation is not required to be in real-time, however, in some of the cases, the failure isolation is in series with the protection switching decision, and therefore may require fast failure isolation (ASON redial is one example). In the scenarios below, we will identify if failure isolation is possible and at what speed.

5) Client failure impact: Refers to the capability of a given architecture to conceal the effects of client failure within the PXC network. In some of the scenarios discussed below, PXC may unnecessarily invoke the protection switching in case of a Client failure. For 1+1 connections, its impact will be contained within the given lightpath, however, for shared mesh protection (SPMesh and ASON), unnecessary protection switching is costly as it causes preemption of low priority traffic on shared protection paths. It can also disrupt Client initiated protection switching.

6.1.1 Type 1: LOL Everywhere Behavior

By LOL everywhere behavior, we mean everywhere in the network the PXC facing ports of the OEOs (drop side Tx) turn off their lasers on seeing any defect conditions (either IRS or AIS). In the table below, "Add OEO" refers to the OEO adjacent to the end-node where the lightpath is initiated, whereas "Drop OEO" refers to the OEO adjacent to the end node where the lightpath is being terminated. The East and West side OEOs surround a thru node on a lightpath.

The behavior can be described as follows:

| Interface Type | Input | Output |
|---|---|---|
| Add OEO/East side OEO | IRS | AIS |
| (Drop side Rx –> Line side Tx) | AIS | AIS |
| Regen | IRS | AIS |
| (Line side Rx –> Line side Tx) | AIS | AIS |
| Drop OEO/West side OEO | IRS | LOL |
| (Line side Rx –> Drop side Tx) | AIS | LOL |

Figure 12:
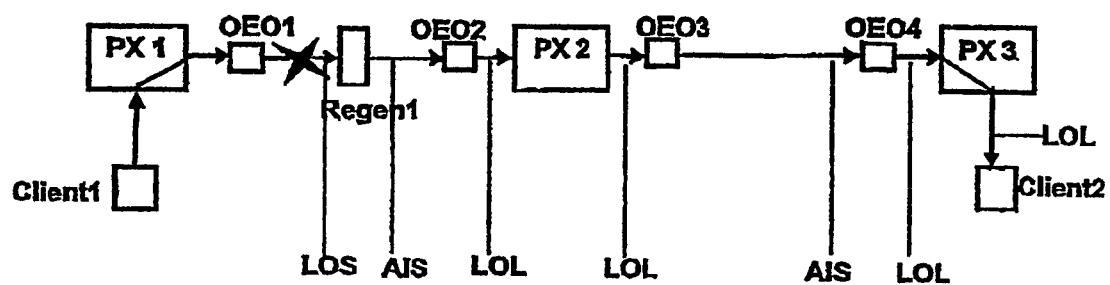
FIG. 12 shows an exemplary optical communication system demonstrating a LOL everywhere behavior.

An example of a Type 1 situation is shown in FIG. 12.

Discussion of Issues:
1) Failure forwarding: Protection switching decision can be made using the LOL condition at the PXC end node. That is, for all of the failure cases described in FIG. 11, we will have PX3 port Rx seeing LOL condition. There is no need for Out of Band forwarding of failure notification.
2) Alarms: It is assumed that the TNE ports will generate alarms when there is a transition into LOL condition. For a failure along PX1→PX2 link, PX2, PX3 and OEO3 (and all of the subsequent east-side OEOs), will also generate alarms. These are spurious alarms and are not desirable for normal network operation. A failure isolation scheme based on XNNI protocol can be used to mask flue alarms generated by PXC nodes, however the alarm masking for TNEs additionally require OPI. In addition, there will be spurious alarms for idle link verification, if we do not assume any interworking between the line system and PXC (i.e., even OPI do not exist).
3) Provisioning: The TNE ports can be configured once and for all, if need be, to satisfy the above behavior. There is no need for dynamic provisioning of the TNE posts in this case at the time of lightpath setup or protection switching (i.e., OPI is not required for provisioning of OEO behavior).
4) Failure Isolation: The PXC→PXC link that failed can be determined by identifying the first PXC port that sees LOL. This can be achieved in real time by either of the failure isolation schemes discussed in section 5. Case analysis:
   Failure along PX1→PX2 link: PX2 and PX3 see LOL. PX1 does not see LOL.
   Failure along PX2→PX3 link: PX1 and PX2 do not see LOL. PX3 sees LOL.
   Failure along Client1→PX1 link: PX1, PX2, and PX3 see LOL. If on the other hand the client is sending AIS, then the failure cannot be isolated, and rather will appear as a failure between PX1 and PX2 link (this is an issue with all of the LOL behaviors in a SONET network).
   Failure along PX3→Client2 is undetected by the PXC network (Note: Such failures are hard to manage by PXC without Client involvement. These will be addressed when trib side or client initiated protection are supported).
5) Client failure impact: If Client I generates AIS, it will cause a protection switch. This can interfere with Client layer protection. If Client 1 generates LOL, it may cause a protection switch at the far end PXC node in the case of 1+1 Platinum service. In the case of SPMesh Gold service, there will not be a protection switch.

In summary, Type 1 behavior has the advantage of fast failure notification at the PXC end node and possibly easy failure isolation, all without TNNI and/or special provisioning through OPI. Its main disadvantage is the generation of too many alarms everywhere downstream from the failure location. In addition, the architecture may not be feasible if TNEs do not convert incoming AIS into LOL. With respect to client failures, there will be a protection switch in case a client AIS is received, in addition the client AIS will not be isolated (client AIS isolation is not specific to this behavior only). Due to LOL condition everywhere, in this case the SPMesh connections will require use of internal alignment laser to dynamically create cross-connects on a protection switching event.

6.1.2 Type 2: LOL at End Node Only

In this case, only drop OEO (OEO adjacent to terminating end-node) is provisioned to switch off the laser in case a failure is detected (both IRS and AIS).

The behavior can be described as follows:

| Inteface Type | Input | Output |
|---|---|---|
| Add OEO/East side OEO | IRS | AIS |
| (Drop side Rx –> Line side Tx) | AIS | AIS |
| West side OEO | IRS | AIS |
| Line side Rx –> Drop side Tx | AIS | AIS |
| Regen | IRS | AIS |
| (Line side Rx –> Line side Tx) | AIS | AIS |
| Drop OEO | IRS | LOL |
| (Line side Rx –> Drop side Tx) | AIS | LOL |

Figure 13:
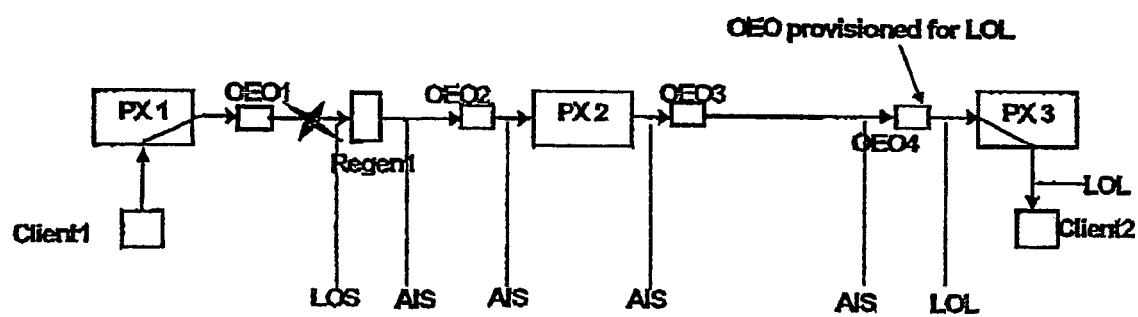
FIG. 13 shows an exemplary optical communication system demonstrating a LOL at end-node behavior.

An example of a Type 2 situation is shown in FIG. 13.

Discussion of Issues:
1) Failure forwarding. Protection switching can be accomplished using the LOL condition at the PXC end node. That is, for all of the failure cases described in FIG. 11, we will have PX3 port Rx seeing LOL condition. There is no need for out of band forwarding of failure notification.
2) Alarms: It is assumed that the TNE ports will generate alarms when there is an LOS condition. For a failure along PX1→PX2 link, PX3 will generate a spurious LOL alarm. Again, the alarm suppression can be handled through a failure isolation scheme within PXC domain. As will be pointed out in provisioning and failure isolation issues, this LOS behavior cannot work without OPI, hence we can assume that OPI will be present and can be used to suppress spurious alarms for idle link verification as well.
3) Provisioning: The TNE ports at the PXC end node (OEO4 Drop side Tx in FIG. 13) should be provisioned to follow the LOL behavior at lightpath provisioning time. This may be accomplished via an NMS for 1+1 connections. However, for SPMesh Gold service or ASTN Silver service, this provisioning needs to occur via OPI. (Note: For SPMesh, a PXC node on the protection path may be a through node for some lightpaths and an end node for some other lightpaths. In order to infer failures of the active protection path and/or to complete the protection switch from working to protection path, dynamic provisioning of LOL behavior is necessary).
4) Failure Isolation: In this case, the failure isolation at the minimum requires OPI. With TNNI, real-time failure isolation is possible, which may not be guaranteed with OPI. The PXC→PXC link that failed can be determined by identifying the first PXC port that sees LOL/AIS. However, this requires OPI as the PXC node cannot distinguish AIS from a good signal. Case analysis:

Failure along PX1→PX2 link: PX2 sees AIS, PX3 sees LOL, and PX1 does not see LOL/AIS Failure along PX2→PX3 link: PX1 and PX2 do not see LOL/AIS. PX3 sees LOL.

Failure along Client1→PX1 link: PX1, PX2, and PX3 see LOL/AIS.

Failure along PX3→Client2 is undetected by the PXC network.

5) Client failure impact: If Client 1 generates AIS, it will cause protection switch. This can interfere with Client layer protection. If Client 1 generates LOL, it may cause a protection switch at the far end PXC node in the ease of 1+1 Platinum service. In the case of SPMesh Gold service, there will not be a protection switch.

In summary, Type 2 behavior provides quick failure notification at the PXC end node, but it requires OPI for provisioning this special behavior at the TNE. OPI/TNNI is also required for failure isolation.

6.1.3 Type 3: LOL at Failure, AIS Elsewhere

In this case, the west side OEO downstream from the failure location will switch off the laser upon seeing a IRS/AIS.

The behavior can be described as follows:

| Interface Type | Input | Output |
| --- | --- | --- |
| Add OEO/East side OEO | IRS | AIS |
| (Drop side Rx –> Line side Tx) | AIS | AIS |
| West side OEO | IRS (at failure) | LOL |
| (Line side Rx –> Drop side Tx) | AIS (elsewhere) | AIS |
| Regen | IRS | R-AIS |
| (Line side Rx –> Line side Tx) | AIS | AIS |
| Drop OEO | IRS | AIS |
| (Line side Rx –> Drop side Tx) | AIS | AIS |

Here R-AIS refers to Regen-AIS, which can be implemented in several ways. Some of the alternatives are:

A WDM Regenerator converts a received IRS condition into an outgoing LOT condition, which is achieved by transmitting unmodulated light at the line side.

By generating a normal AIS signal with some bit in the overhead set to indicate to the downstream TNE that it is an IRS condition.

Figure 14:
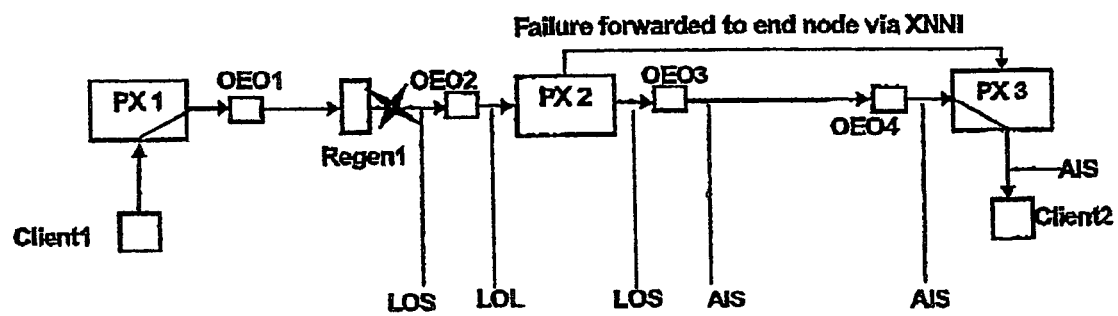
FIG. 14 shows an exemplary optical communication system demonstrating a LOL at failure behavior.

An example of a Type 3 situation is shown in FIG. 14.

There are several serious problems with this approach:

1) The assumption that IRS into a Regen will translate into a R-AIS condition on the line may not be valid for some WDM line systems. If on the other hand, it translates an incoming IRS into an outgoing AIS, no PXC node on the lightpath will be aware of the failure (as PXC has no knowledge of the AIS condition without TNNI).
2) The defect may not be detectable at the end node, which requires a failure forwarding mechanism through an out of band XNNI protocol. Since the latency associated with transport of defect indication across XNNI can be significantly large compared to detection at the end-node through an LOL, the protection switching time may not meet the SLA for 1+1 (it may also be the case for SPMesh).
3) An LOS failure on the PXC→TNE link (e.g., PX2→OEO3) will translate into an AIS at every node downstream. In this case, no PXC node on the lightpath is aware of the failure.

Discussion of Issues:

1) Failure forwarding: In this case, failure forwarding is necessary. The PXC end node will not necessarily know of the failure (unless it is a failure of the TNE→PXC link at the end node), so it has to rely on XNNI based message forwarding from the PXC node immediately downstream from the failure.
2) Alarms: There are not many spurious alarms in this case, only an additional LOS alarm generated by the OEO at the PXC node adjacent to the failure (e.g., OEO3 in FIG. 14). The suppression of this alarm will require a failure isolation scheme within PXC and existence of OPI.
3) Provisioning: No provisioning of WDM equipment is necessary on a per lightpath basis. Some static provisioning (at TNE commissioning time) to configure LOL mode may still be required.
4) Failure Isolation: If a PXC node other than the source node sees LOL (e.g., PX2), then the failure is isolated to the link between the immediately upstream PXC node and this PXC (e.g., PX1→PX2).
5) Client failure impact: If Client 1 generates AIS, it will not cause protection switch. If Client 1 generates LOL, then the first OEO on the path will convert it to AIS.

Furthermore, PX1 will not forward any failure information downstream. Therefore, there will not be any protection switching.

In summary, Type 3 behavior does not provide a complete solution.

6.1.4 Type 4—LOL at Failure, LOL at End Node

This is a modification of Type 3 behavior. We add the LOL behavior at the end node so that forwarding of failure to the end node is not necessary. It attempts to provide failure isolation without OPI/TNNI as well as failure notification at the end node without TNNI. However, it still suffers from the two problems that afflict Type 3 as far as failure isolation goes. It works fine for failure notification at the end node.

The behavior can be described as follows:

| Interface Type | Input | Output |
| --- | --- | --- |
| Add OEO/East side OEO | IRS | AIS |
| (Drop side Rx –> Line side Tx) | AIS | AIS |
| West side OEO | IRS (at failure) | LOL |
| (Line side Rx –> Drop side Tx) | AIS (elsewhere) | AIS |
| Regen | IRS | R-AIS |
| (Line side Rx –> Line side Tx) | AIS | AIS |
| Drop OEO | IRS | LOL |
| (Line side Rx –> Drop side Tx) | AIS | LOL |

Figure 15:
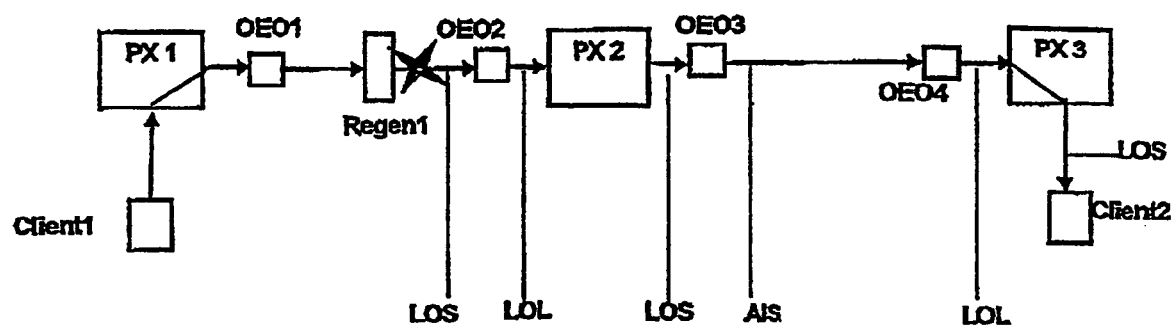
FIG. 15 shows an exemplary optical communication system demonstrating a LOL at failure and end-node behavior.

An example of a Type 4 situation is shown in FIG. 15.

There are a couple of problems with failure isolation is this approach:

1) An LOS failure on the PXC→TNE link (e.g., PX1→OEO1) will translate into an AIS at every node downstream except at the PXC end node which will see LOL. So failure isolation will require OPI in this case.
2) The assumption that IRS into a Regen will translate into an R-AIS condition on the line may not be valid for most WDM line systems. If on the other hand, it translates an incoming IRS into an outgoing AIS, failure isolation will require OPI.

Discussion of Issues:

1) Failure forwarding: In this case, the failure forwarding through XNNI is not necessary. This is because we have LOL behavior at the PXC end node.
2) Alarms: There are not many spurious alarms in this case, only two additional LOS alarms generated by the OEOs at the PXC node adjacent to the failure (e.g., OEO3) and end node PX3 that can be masked through failure isolation and OPI.

3) Provisioning: The TNE at the PXC end node has to be provisioned for LOL behavior on a per lightpath basis, and so requires OPI.
4) Failure Isolation: If a PXC node other than the source node sees LOL (e.g., PX2), then the failure is isolated to the link between the immediately upstream PXC node and the first PXC that sees LOL. For example, for a failure along PX1→PX2 as shown in FIG. 15, both PX2 and PX3 will see LOL, hence a failure isolation scheme described later can attribute the failure to PX1→PX2 link. This is true except for the two problem cases mentioned above.
5) Client failure impact: If Client 1 generates AIS/LOL, it will cause protection switch for 1+1 as the PXC end node will see LOL. SPMesh can mask off LOL as client signal defect, but client AIS will result in protection switching.

In summary, Type 4 behavior does not provide a complete solution. However, in most of the failure cases, it provides quick failure notification and easy failure isolation. Since the end node has to be specially provisioned for LOL behavior, it requires OPI.

6.1.5 Type 5: Differentiated AIS Everywhere

The general idea behind this approach is to signal an ALS (from the attached OEO) in a manner that can be detected through optical signal detection mechanisms available in PXC. The two proposed variations of this approach are:
Weak AIS everywhere
Strong AIS everywhere
Pulsed AIS everywhere In the case of Weak AIS, the OEO drop side Tx launch power is lowered (3 dB below normal) when the signal generated is an AIS condition. The assumption is that the cross-connection through the PXC can still be accomplished (means 3 dB margin on the link budget). One advantage this proposal has over the LOL everywhere (Type 1) behavior is that with respect to the digital network, the TNE behavior is not altered. This leads to fewer alarms in case of a failure. Launching AIS at lower power also allows the PXC to distinguish between Loss of Light, AIS, and normal conditions.

In the case of Strong AIS, the OEO drop side Tx launch power is increased, say 3 dB above normal, when the signal generated is an AIS condition. The advantages associated with this proposal are the same as those outlined for weak AIS behavior. However, the assumption that the attached OEO is capable of increasing the launched power by 3 dB may not be true for some OEOs, as the maximum output laser power may be limited on such interfaces.

In the case of pulsed AIS, the OEO drop side Tx will switch between AIS and LOL periodically, say every one second. This will allow the PXC to detect the presence of a defect through internal LOL mechanisms, at the same time the generation of unnecessary LOS alarms by the OEOs will be suppressed. This is due to the reason that the generation of LOS alarms requires an integration period of 2.5 seconds. This scheme will not allow for fast distinction between AIS and LOL at the PXC, but it is not an issue, as the protection switching decision can be made through LOL detection only.

The behavior may be described as follows:

| Interface Type | Input | Output |
|---|---|---|
| Add OEO/East side OEO | IRS | AIS |
| (Drop side Rx -> Line side Tx) | AIS | AIS |
| Regen | IRS | AIS |
| (Line side Rx -> Line side Tx) | AIS | AIS |

-continued

| Interface Type | Input | Output |
|---|---|---|
| Drop OEO/West side OEO | IRS | D-AIS |
| (Line side Rx -> Drop side Tx) | AIS | D-AIS |

D-AIS stands for Differentiated AIS.

Technical Feasibility:
1) A major issue with this approach is that the power cool may only work for IR/LR interfaces on the drop side, as it may not be technically feasible to control the power of SR lasers.
2) The weak AIS approach assumes that the TNE-TNE or TNE-Client link with an intermediate PXC node can accommodate an extra 3 dB link loss (lower power differential for AIS signal such as 1-2 dB may not work as it does not provide enough isolation between normal and AIS signal). This may not be a big issue as the PXC loss budget assumes very low BER requirement, which may not be the case for AIS signals.
3) As an alternative to lowering power on the drop side transmitter in the event of an AIS, special payloads can be constructed which result in lower average power measurement at the PXC port. The presence of AIS to the downstream TNE is indicated through AIS-L overhead bytes. This solution complies with the detection capabilities of AIS-L, but will not comply with AIS-L generation requirements.
4) An issue with pulsed AIS in the digital wrapper network is that the East side OEOs will switch between AIS-L and ODUk-AIS based on whether it sees AIS-L or LOL.

Figure 16:
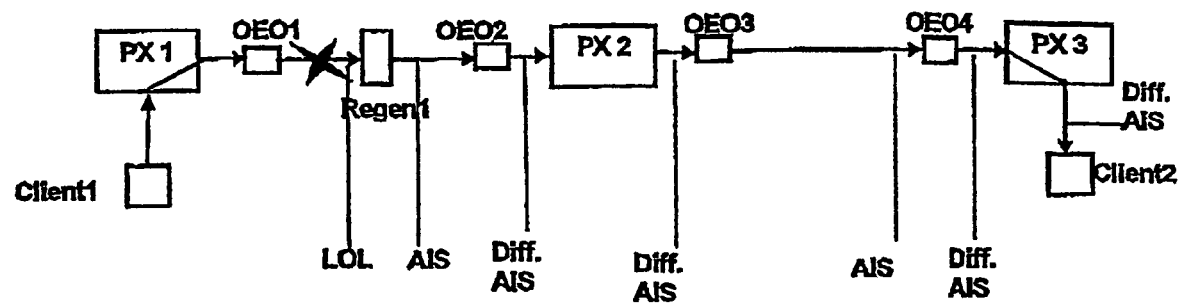
FIG. 16 shows an exemplary optical communication system depicting differentiated AIS behavior.

An example of a Type 5 situation is shown in FIG. 16.

Discussion of Issues:
1) Failure forwarding: In this case, the failure forwarding is not necessary as the PXC end node (PX3 above) will either see a D-AIS signal or LOL in case of lightpath failure.
2) Alarms: This is the main advantage of the differentiated AIS behavior over LOL everywhere. No alarms will be generated as the OEO still sees or generates valid signals, for weak/strong AIS, and the duration of LOL is below the slang threshold for pulsed AIS mode.
3) Provisioning: All the OEO drop side Tx should be programmed into either Weak, Strong, or Pulsed AIS mode once and for all (probably through NMS at equipment commissioning time). There is no need for dynamic provisioning.
4) Failure isolation: This is very similar to Type 1 LOL everywhere behavior. The failure isolation protocol described later in the document can be used. Client AIS conditions are still hard to detect.
5) Client failure impact: If the Client generates LOL, the source PXC end node notices this and can prevent protection switching from occurring. If the Client generates AIS, the PXC end nodes are not aware of this and this results in unnecessary protection switching.

6.1.6 Type 6: TNNI Everywhere

In this case, we assume that TNNI is enabled at all points along the lightpath. TNNI enables FDI and DDI from the TNE to the PXC. In addition to this, PXC can determine LOL at the PXC port and an internal node failure. The WDM line systems have normal behavior. No special LOL behavior is required.

Discussion of Issues:
1) Failure forwarding: In this case, failure forwarding is not necessary as the PXC end node can infer about the failure via TNNI.
2) Alarms: WDM systems have normal behavior, so there are no spurious alarms on OEOs along the lightpath.
3) Provisioning: No provisioning is required for special behavior on the TNE ports other than to initiate/stop defect monitoring for enabling TNNI.
4) Failure Isolation: In this case, failure isolation is very easy; every PXC node needs to look at TNNI FDI and BDI and internal LOL conditions to determine if a PXC-PXC link is down. If necessary, it can inform the PXC node at the other end of the link about the failure.
5) Client Failure impact: An AIS from a Client can be detected by the first OEO on the path. This can be used to prevent unnecessary protection switching at the optical layer (unless the protection switching is carded out without signaling as in Xros 1+1 Platinum service).

In summary, Type 6 behavior is ideal for failure isolation as well as failure notification at the end node. Since failure isolation is quick, it can be used to implement different protection schemes such as hybrid link-mesh, segmented protection in domains, etc. It also permits WDM line systems to practice normal behavior, so there are no unwanted alarms. It also provides better detection of Client signal failure.

6.1.7 Type 7: AIS Tap

Figure 17:
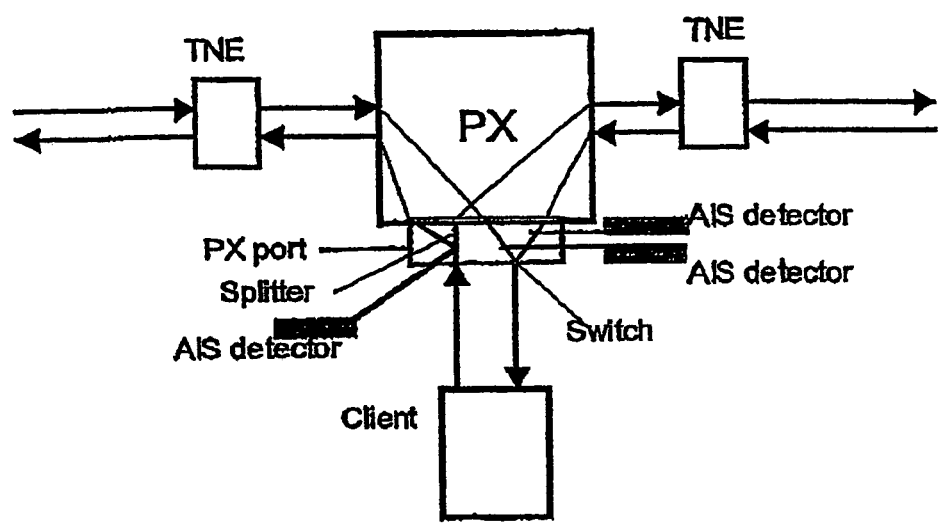
FIG. 17 shows an exemplary AIS tap.

The idea here is to have special taps at the tributary side (add/drop) ports of the PXC. AIS detector circuits are attached to the taps. The AIS detector circuits can report an AIS or LOT/LOF condition on the signal that is being tapped, as shown in FIG. 17. There are two AIS taps at the output (one for each of the redundant paths) and one AIS tap for the input (tap at the input is optionally required to detect client AIS. If detection of client AIS is not important, input AIS detector can be removed).

Normal behavior of the WDM line systems is maintained in this case.

Discussion of Issues:
1) Failure forwarding: Failure forwarding from the location of failure is not necessary as AIS and IRS conditions can be detected at the PXC end node.
2) Alarms: Normal behavior of WDM systems is maintained, so no unnecessary alarms are generated.
3) Provisioning: There is no need for any special provisioning of WDM line system equipment.
4) Failure isolation: In this case, failure isolation will be hard and cannot be done in real-time. Since there is no detection of a failure at an intermediate PXC node, failure isolation can be performed by carrying out link verification on all links of a known failed path and is explained in section 7.3 below. The same drawbacks hold for all of the line system independent (standalone) solutions (Type 7-Type 10).
5) Client failure impact: If the client generates an AIS, this will be detected by the AIS tap at the add port and the PXC will interpret this as a Client Signal Defect condition and protection switching will not occur. If the client output laser fails resulting in an LOL condition, the PXC add port will detect the LOL condition and protection switching can be prevented.

Note: in this case, we may not need an AIS tap at the client input. The solution will work as follows:

For 1+1 connections, AIS taps are active on both working and protect path on local as well as remote end-node. The remote end-node, after seeing AIS on both taps, can infer that it is client AIS. However, the protection switching at the remote end-node cannot be avoided (as there is no signaling between local and remote end-node).

For SPMesh connections, the client signal, during normal mode, is selected from the working path. Hence, the client signal can be looped back through the remaining core to detect client AIS.

6.1.8 Type 8: OEO at Add/Drop Port

Figure 18:
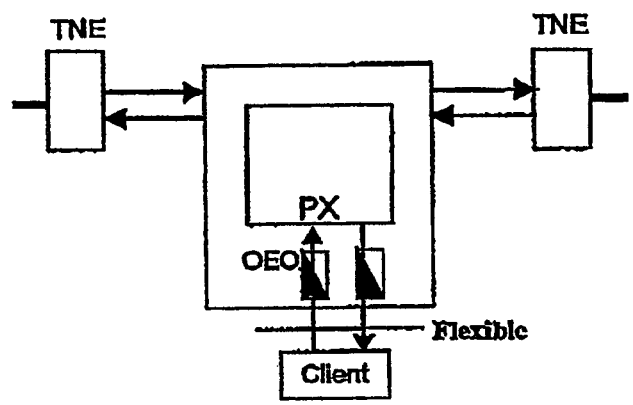
FIG. 18 shows an exemplary OEO at an add/drop interface.

In this case, an OEO is provided for each of the add-drop connection supported by the PXC, as shown in FIG. 18. The advantage associated with this approach is that it permits detection of the failure conditions existing in the optical network without any interworking with the surrounding line system. In addition, presence of an OEO between client equipment and PXC port provides a flexible interface. Some of the advantages associated with this flexible interface are:
   Clear demarcation for SLA verification across client Interface
   Isolation from link budget issues due to a weak client signal
   Architecture suitable for transition to a digital wrapper (OTN) network
   Easy detection of client AIS
   Normal behavior of the WDM line systems is maintained.
   Some of disadvantages associated with this approach are:
   Additional cost of two OEOs
   Does not provide continuous monitoring of non-selected path
   Adds a single point of failure within a lightpath One of the disadvantages of this approach, non-continuous monitoring of the path which is not currently selected, requires further explanation and is discussed in details below.

Figure 19:
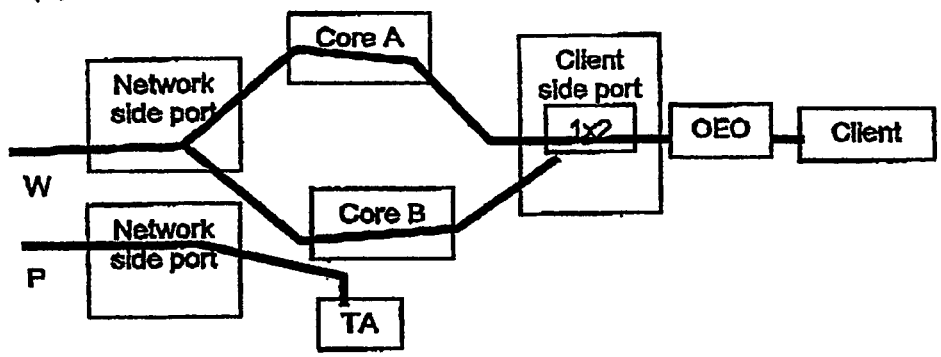
FIG. 19 shows an exemplary process of 1+1 network protection switching and its interaction with the internal equipment protection including a normal mode, an equipment protection mode, and a network protection mode.
Figure 19:
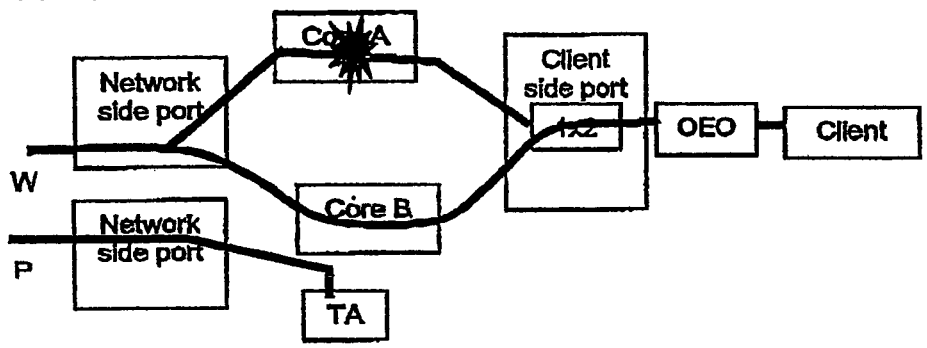
Figure 19:
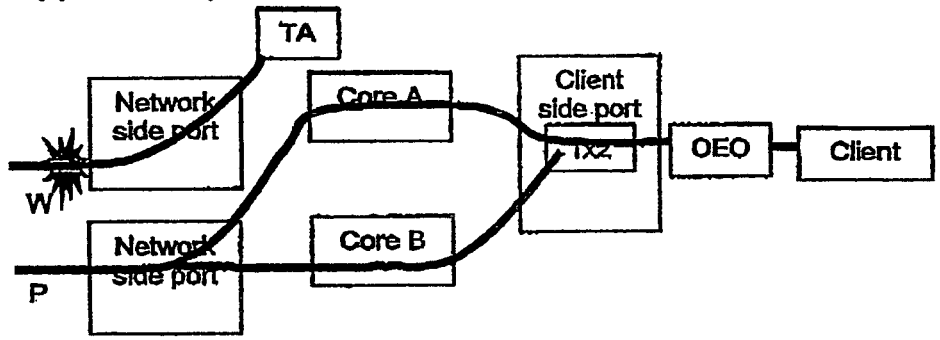

Modified 1+1 Architecture:
   In the architectures discussed about, the PXC has visibility to the health of both working and protect paths, either through inter-operation with the WDM line systems or through internal monitoring, such as AIS tap behavior. However, in the case of OEO at the add/drop ports of PXC, the monitoring of the defects can be performed only on the selected path, and therefore requires a special behavior for 1+1 protection switching. The overall process of 1+1 network protection switching and its interaction with the internal equipment protection in this case is shown in FIG. 19.

At a high level, the details of 1+1 network and equipment protection in this case are:
   The selected path, W path in FIG. 19(a), is continuously monitored.
   The unselected path, P path in FIG. 19(a), is periodically monitored through a test access (TA) facility. This monitoring will most likely be scheduled with other monitoring functions such as idle link verification, auto discovery, user initiated requests, etc., and therefore will delay the alarms from PXC on P path failure. However, there will be alarms from the OEOs on P-path. If sufficient test resources are available, the user may dedicate a test access resource for P-path monitoring.
   In case of a hard failure (Signal Fail) on the selected path, W path in FIG. 19(c), or a forced switch, the other path will be selected regardless of the health of that path. This is not an issue, as selecting non-functional path will not further deteriorate the quality of the selected signal.
   In case of a soft failure (Signal Degrade) on the selected path or a manual switch, a request will be sent to verify the quality of the unselected path. Only in case the quality of the unselected path is better than that of the selected path, the switch will be issued. It should be noted that protection switch in such cases are not time critical, so the on-demand verification of unselected path is not required to be fast.

In the case of an internal failure within the selected core, as shown in FIG. 19(b), the internal LOL detection can be used to perform an equipment protection through 1×2 switch to select signal from the healthy core.

In case both paths are bad, due to either a client failure or a double network failure, the path switching from say W to P and back to W will happen. In this case, after two successive network protection switches, it will be ascertained that failure on both paths exist. Hence either one of these can be selected, while the other will be periodically monitored, as in the normal mode of operation.

In case of a double equipment failure on the selected path, the network protection switch can be utilized to select signal from the unselected path. This will allow protection against some additional equipment failure modes.

One benefit of the proposed 1+1 behavior is that it allows decoupling the network protection from the equipment protection. Hence in the case of an internal equipment failure, there is no need to select signal from a path with unknown quality. Instead the copy of the selected signal through the other core can be used to provide equipment protection. The major drawback of the proposed 1+1 behavior is that in the case of a hard failure on the selected path, a new cross-connect, which is probably not tested before, is required to be established in real-time.

Discussion of issues:
1) Failure forwarding: Failure forwarding from the location of failure is not necessary as AIS and IRS conditions can be detected at the PXC end node.
2) Alarms: Normal behavior of WDM line systems is maintained, so no unnecessary alarms are generated.
3) Provisioning: There is no need for any special provisioning of WDM line system equipment.
4) Failure isolation: Since there is no detection of a failure at an intermediate PXC node, failure isolation can be performed by carrying out link verification on all links of a known failed path. This approach is described in section 7.3.
5) Client failure impact: If the client generates an AIS/IRS, this will be detect by the add side OEO and the PXC will interpret this as a Client Signal Defect condition and protection switching will not occur for SPMesh connections. In the case of 1+1 connections, the local end-node can detect the presence of client signal defect, either through add OEO or through internal LOL. However, the remote end-node will go through double path switching as described above in the modified 1+1 behavior.

6.1.9 Type 9: OEO at Drop Port

Figure 20:
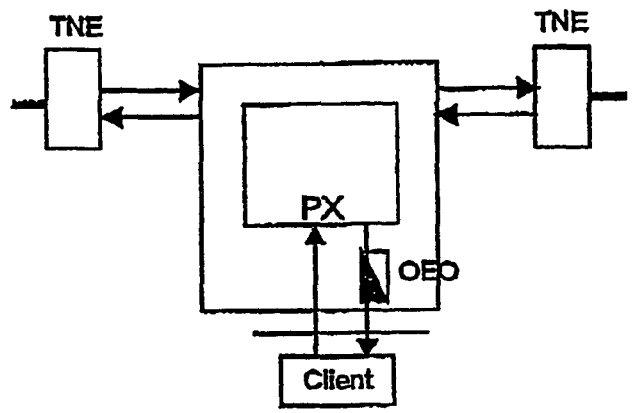
FIG. 20 shows an exemplary configuration with an OEO at the drop port.

This architecture is similar to Type 8 described in the section above, except that OEO is only provided at the drop port, as shown in FIG. 20. This approach will allow PXC to detect failure conditions within the network without a need for interworking with the line system. This is a lower cost solution as compared to Type 8, at the expense of losing most of the advantages associated with an OEO both in the add and drop direction. The modified behavior of 1+1 protection switching described in the case of OEO at add/drop port, in section 4.1.8, also applies in this case.

Discussion of Issues:
1) Failure forwarding: Failure forwarding from the location of failure is not necessary as AIS and IRS conditions can be detected at the PXC end node.
2) Alarms: Normal behavior of WDM line system is maintained, so no unnecessary alarms are generated.
3) Provisioning: There is no need fix any special provisioning of WDM line system equipment.
4) Failure isolation: Same as Type 8.
5) Client failure impact: If the client generates an AIS/IRS, this will not be detected by the PXC add port. Rather, an AIS will be detected by the drop OEO on the remote end node and will result in protection switching for both 1+1 and SPMesh connections. If the client output laser fails resulting in an LOL condition, the PXC add port will detect the LOL condition and protection switching can be prevented for SPMesh. However, in the case of 1+1, the remote end-node will perform protection switching even with client LOL.

6.1.10 Type 10: Receiver at Drop Port

Figure 21:
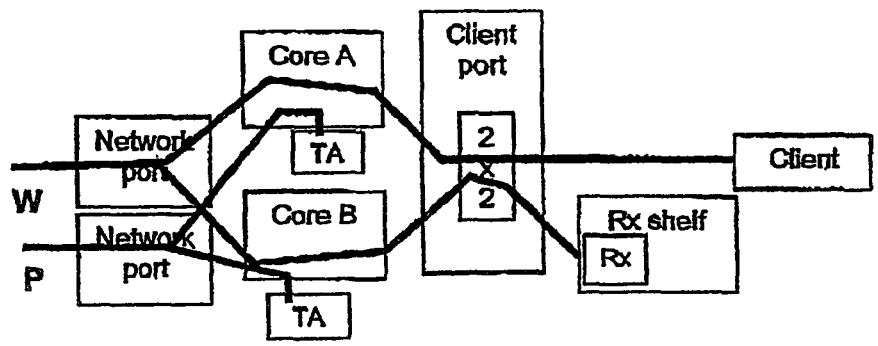
FIG. 21 shows an exemplary configuration with a receiver at the drop port.

This is another variation of architecture specified for Type 9. However, the difference in this case is that the OEO which was in series with the client equipment on the drop side is replaced by an OE (optical to electrical) receiver operating on a copy of the dropped signal to the client. The advantages associated with this approach are that it does not add a single point of failure within a lightpath and the receiver can be a very simple one. It, however, requires some modifications to the architecture of PXC, shown in the form of a client port with 2×2 switch in FIG. 21.

The issues with this approach are identical to the ones described for Type 9 in section 6.1.9 above.

6.2 Digital Wrapper Network

Figure 22:
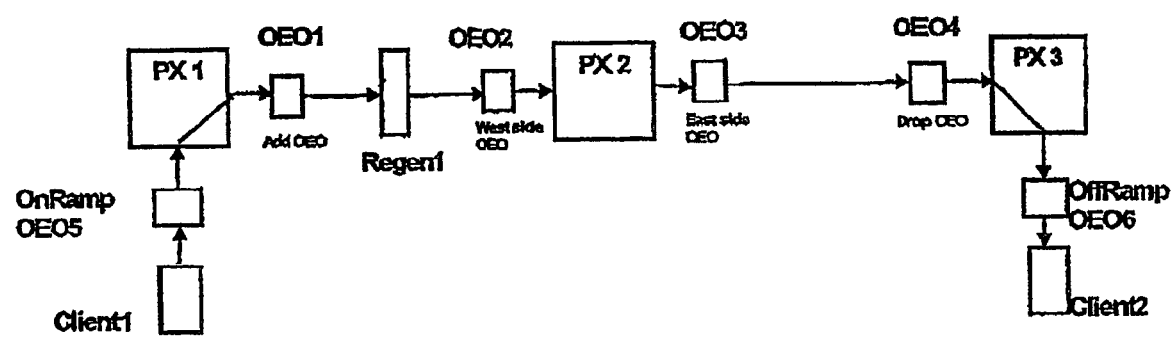
FIG. 22 shows an exemplary wrapper network.

In this subsection, we consider the LOS behaviors in a Digital Wrapper based WDM network. A reference lightpath (only one direction) is shown in FIG. 22. Note that OEO5 and OEO6 are On-ramp/Off-ramp terminals that convert data between SONET and Wrapper protocols. An On-ramp terminal takes SONET signal from a Client and encapsulates it in a Wrapper payload. The Off-ramp terminal removes the Wrapper and sends the SONET signal contained within to the Client. OEO1 through OEO4 are Wrapper terminals, i.e., wrapper (in)-wrapper (out). There are several advantages of this network architecture over a pure SONET network. Some of these are as follows:

1) Protocol independence: A digital wrapper network can carry client signals that conform to various protocols, such as SONET, SDH, Gigabit Ethernet, or Digital Wrapper itself. It is the responsibility of the On-ramp and Off-ramp terminals to interface with the Client. The WDM links will then carry Wrapper signals only.
2) Service Level Agreements: It permits various levels of tandem connection monitoring (TCM) capabilities to allow SLA verification at UNI-NNI, NNI-NNI, and NNI-UNI interfaces. In addition, it provides inter-vendor interface specification as a part of intra-domain interface, to allow interoperability between equipments from different vendors within the same service provider network.
3) Autodiscovery, Link verification: The digital wrapper overhead bytes may be used to facilitate autodiscovery and link verification between adjacent network elements. In a SONET network, it may be not be possible to modify the overhead bytes for this purpose.
4) Lightpath Trace monitoring: The overhead bytes may be used to carry a lightpath trace identifier end to end. It is inserted by OEO5 and monitored along all segments until it is removed by OEO6. This may not be possible in a SONET network, if it is not permissible/possible to modify unused overhead bytes.
5) Forward Error Correction (FEC): FEC is performed at each section individually. Hence FEC monitoring at each intermediate OEO leads to enhanced end-to-end BER performance and monitoring.

In the following we will discuss some of the possible opaque architectures within a wrapper network and explain the suitability of each with respect to failure forwarding, alarms, provisioning, failure isolation, and effects of client signal failure. In order to avoid excessive repetition, we will only identify the difference with respect to a corresponding behavior within SONET network.

Within a wrapper network, we will consider the following types of failure conditions:

1) IRS: This condition can arise from LOT, LOL, LOF, High BER, etc.
2) ODUk-AIS: Alarm Indication Signal generated at the ODUk layer within a digital wrapper network. This maintenance signal is sent downstream after a defect has been detected within a wrapper network.
3) G-AIS: An AIS signal received from outside the wrapper network, for example, a client or at the interface of SONET and wrapper network. For transport within wrapper network, the client AIS will be mapped within a good wrapper. This will be true for On-ramp cards, where failures on SONET side will not result in ODUk-AIS on the wrapper side.

6.2.1 Type 1: LOL Everywhere Behavior

By LOL everywhere behavior, we mean everywhere in the wrapper network that the PXC facing ports of the OEOs (drop side Tx) turn off their lasers on seeing any defect conditions (either IRS or ODUk-AIS). In the table below, the "Add OEO" refers to the OEO within wrapper network adjacent to the end-node where the lightpath is initiated, whereas the "Drop OEO" is the OEO (within wrapper network) adjacent to the end-node where the lightpath is being terminated. The East and West side OEOs surround a through node on a lightpath. In addition there are On-ramp and Off-ramp cards between client and PXC to perform the required adaptation function.

The behavior can be described as follows:

| Interface Type | Input | Output |
|---|---|---|
| On-ramp | IRS | G-AIS |
| SONET Rx → Wrapper Tx | AIS | G-AIS |
| Add OEO/East side OEO | IRS | ODUk-AIS |
| (Drop side Rx → Line side Tx) | ODUk-AIS | ODUk-AIS |
| Regen | IRS | ODUk-AIS |
| (Line side Rx → Line side Tx) | ODUk-AIS | ODUk-AIS |
| Drop OEO/West side OEO | IRS | LOL |
| (Line side Rx → Drop side Tx) | ODUk-AIS | LOL |
| Off ramp | IRS | AIS |
| Wrapper Rx → SONET Tx | ODUk-AIS | AIS |

Figure 23:
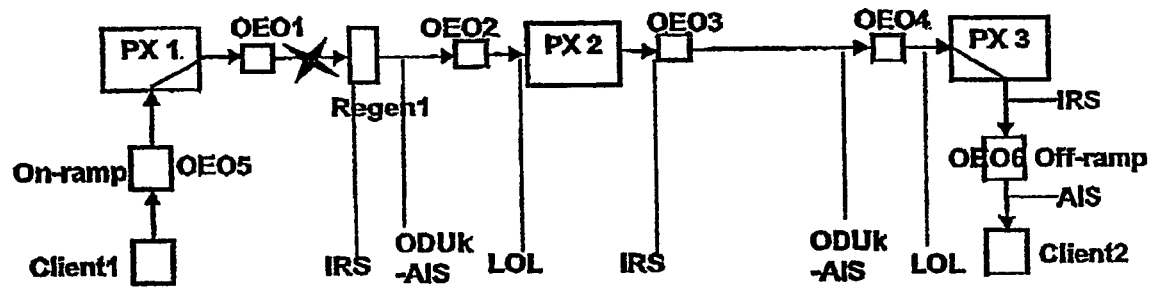
FIG. 23 shows an exemplary wrapper network with a LOL everywhere behavior.

An example of a Type 1 situation is shown in FIG. 23.

Discussion of Issues:

1) Failure forwarding: Same as in SONET case.
2) Alarms: Same as in SONET case.
3) Provisioning: Same as in SONET case, but with the difference that to suppress unnecessary alarms for idle link verification, we will require OPI support to utilize ODUk-AIS signaling within wrapper network.
4) Failure Isolation: The PXC→PXC link that failed can be determined by identifying the first PXC port that sees LOL. Case analysis:
   Failure along PX1→PX2 link: PX2 and PX3 see LOL. PX1 does not see LOL.
   Failure along PX2→PX3 link: PX1 and PX2 do not see LOL. PX3 sees LOL.
   Failure along Client1→OEO5 link: OEO5 inserts AIS-L within a good wrapper. Therefore, PX1, PX2, and PX3 see no failure. The off-ramp OEO6 strips the wrapper and delivers AIS-L to Client2.
   Failure along OEO5→PX1 link: The failures resulting in absence of light at PX1 port will be detected by PX1 (these conditions will result in LOL at all of the subsequent PXCs). However, other failure modes which do not result in LOL at PX1 will be detected only by first OEO between PX1 and PX2 (OEO1 in this case), hence failure isolation will not be possible without OPI (same as in SONET case).
   Failure along Px3→OEO6 will be detected by OEO6, which will send AIS-L to Client2. However, the failure will not be detected within PXC network and will not result in protection switching (unless augmented by TNNI).
   Failure along OEO6→Client2 will be undetected.
   Failure isolation can be accomplished by communicating and correlating with the upstream PXC node and/or downstream PXC node. Note that the isolation of failure between On-ramp OEO and PXC has the same issue as with Client AIS isolation in the SONET network.
5) Client failure impact: If Client1 generates AIS, or an IRS is detected at the OEO5, it will generate an AIS-L within a good wrapper towards the PXC network. This will provide necessary isolation from defects occurring outside the PXC network. This is a significant advantage over the corresponding SONET solution.

In summary, this case is essentially the same as in the corresponding SONET case, with the main different being an isolation from client failures (this is true for all of the behaviors specified for wrapper network).

6.2.2 Type 2: LOS at End-Nodes

The behavior can be described as follows:

| Interface Type | Input | Output |
|---|---|---|
| On-ramp | IRS | G-AIS |
| SONET Rx –> Wrapper Tx | AIS | G-AIS |
| Add OEO/East side OEO | IRS | ODUk-AIS |
| (Drop side Rx –> Line side Tx) | ODUk-AIS | ODUk-AIS |
| Regen | IRS | ODUk-AIS |
| (Line side Rx –> Line side Tx) | ODUk-AIS | ODUk-AIS |
| West side OEO | IRS | ODUk-AIS |
| (Line side Rx –> Drop side Tx) | ODUk-AIS | ODUk-AIS |
| Drop OEO | IRS | LOL |
| (Line side Rx –> Drop side Tx) | ODUk-AIS | LOL |
| Off-ramp | IRS | AIS |
| Wrapper Rx –> SONET Tx | ODUk-AIS | AIS |

Figure 24:
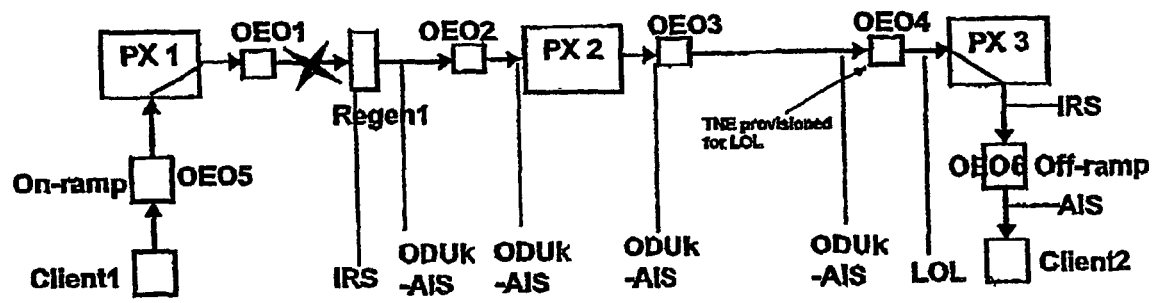
FIG. 24 shows an exemplary wrapper network with a LOL at end-node behavior.

An example of a Type 2 situation is shown in FIG. 24.

Discussion of Issues:

This behavior is very similar to the one described for the corresponding SONET solution. As discussed earlier, this solution will require OPI for dynamic provisioning of OEOs as well as for failure isolation. However, in the case of wrapper network, faster and more reliable failure isolation is possible if the OEOs support Fault Type Fault Location (FTFL) capability available within ODUk overhead of digital wrapper.

6.2.3 Type 3: LOL at Failure, AIS Elsewhere

The behavior can be described as follows:

| Interface Type | Input | Output |
|---|---|---|
| On-ramp | IRS | G-AIS |
| SONET Rx -> Wrapper Tx | AIS | G-AIS |
| Add OEO/East side OBO | IRS | ODUk-AIS |
| (Drop side Rx -> Line side Tx) | ODUk-AIS | ODUk-AIS |
| Regen | IRS | ODUk-AIS |
| (Line side Rx -> Line side Tx) | ODUk-AIS | ODUk-AIS |
| West side OEO | IRS (at failure) | LOL |
| (Line side Rx -> Drop side Tx) | ODUk-AIS (elsewhere) | ODUk-AIS |
| Off-ramp | IRS | AIS |
| Wrapper Rx -> SONET Tx | ODUk-AIS | AIS |

Figure 25:
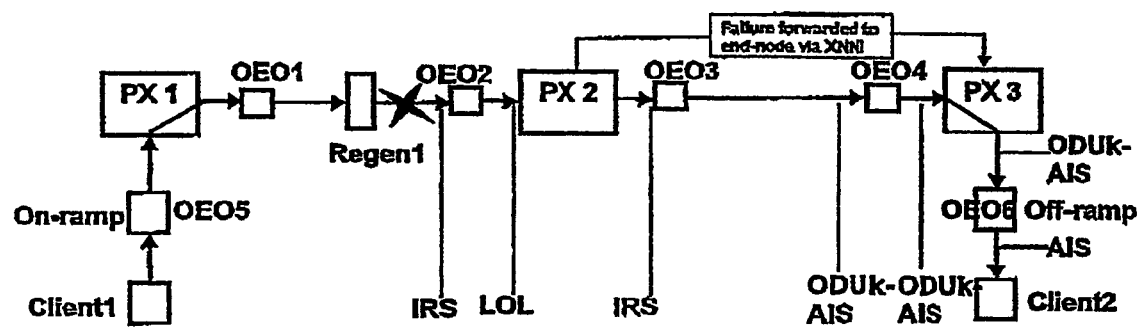
FIG. 25 shows an exemplary wrapper network with a LOL at failure behavior.

An example of a Type 3 situation is shown in FIG. 25.

Discussion of Issues:

This behavior is similar to the one described for SONET network.

Recap from SONET behavior:

There are a few serious problems with this approach:

1) An LOS failure on the PXC→TNE link (e.g., PX1→OEO1) will translate into an ODUk-AIS at every node downstream. In this case, no PXC node on the lightpath is aware of the failure.
2) An IRS condition before a WDM regeneration will be translated into an outgoing ODUk-AIS, so no PXC node on the lightpath will be aware of the failure (as PXC has no knowledge of the AIS condition without TNNI).

However, in the case of wrapper network, the issues stated above can be resolved if TNEs are capable of interworking with FTFL carried within ODUk overhead. Hence the desired behavior in this case can be modified to look at FTFL, when an ODUk-AIS is received on the line side, to selectively (based on the location of fault) turn off the laser on the Drop side Tx attached to the PXC port.

6.2.4 Type 4: LOL at Failure, LOL at End Node

The behavior can be described as follows:

| Interface Type | Input | Output |
|---|---|---|
| On-ramp | IRS | G-AIS |
| SONET Rx -> Wrapper Tx | AIS | G-AIS |
| Add OEO/East side OEO | IRS | ODUk-AIS |
| (Drop side Rx -> Line side Tx) | ODUk-AIS | ODUk-AIS |
| Regen | IRS | ODUk-AIS |
| (Line side Rx -> Line side Tx) | ODUk-AIS | ODUk-AIS |
| West side OEO | IRS (at failure) | LOL |
| (Line side Rx -> Drop side Tx) | ODUk-AIS (elsewhere) | ODUk-AIS |
| Drop OBO | IRS | LOL |
| (Line side Rx -> Drop side Tx) | ODUk-AIS | LOL |
| Off-ramp | IRS | AIS |
| Wrapper Rx -> SONET Tx | ODUk-AIS | AIS |

Figure 26:
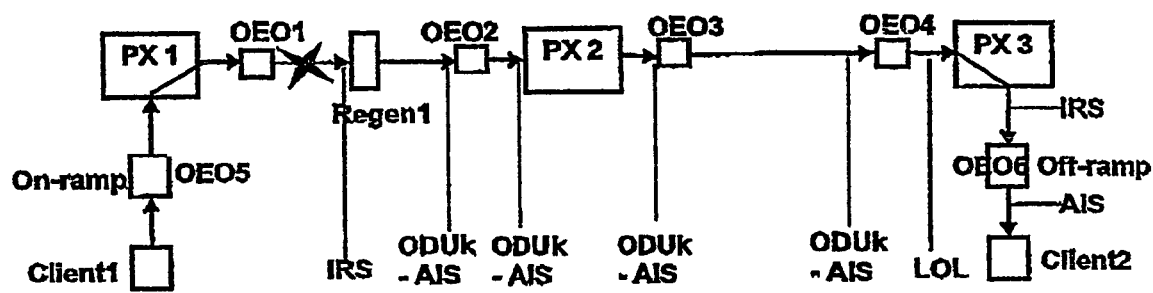
FIG. 26 shows an exemplary wrapper network with LOL at failure and end-node behavior.

An example of a Type 4 situation is shown in FIG. 26.

The issues are the same as in the corresponding SONET case.

6.2.5 Type 5: TNNI Everywhere

In this case, we assume that TNNI is enabled at all points along the lightpath. The benefits of this approach are very similar to the ones described for the SONET case. However, the TNNI protocol in this case may need to support different behaviors during idle and active states of the OCh links.

7 Failure Isolation

When a path fails, it is important to know which PXC-PXC link or links along the path have failed. Determining which PXC-PXC link(s) failed along the lightpath is called Failure Isolation. The failure of the link may be attributed to a failure along the WDM link between two PXC nodes, to a PXC nodal failure, or to other reasons. Once the failure is localized, the link state (topology) database can be updated so that new lightpaths will not use that link. In the case of G.ASTN enabled networks, it is important that failure isolation occurs fast. This is because an alternate route for a failed lightpath may be computed to route around the failure in a dynamic manner as opposed to a pre-provisioned protection route as in 1+1 protection switching.

As discussed earlier, when a failure is detected, the path should not be removed before the failure is isolated. One way to preserve the state of the affected path, during failure isolation, while not slowing down the protection switching, is to bridge the signal to both the working and the protection path. This is true for 1+1 connections, by default. However, for SPMesh connections, this requirement cannot be enforced for failures along the protection path. Hence, failure isolation in this case will have to make use of other techniques, such as failure isolation through idle link verification or other means.

In general, with TNNI, a sufficiently robust failure isolation within a PXC network can be achieved. However, in the absence of TNNI, an out of band scheme, transported over XNNI links, is required. In the following, some failure isolation schemes with and without the support of TNNI are discussed.

7.1 Failure Isolation without TNNI

There are several proposals to achieve failure isolation without receiving appropriate defect indications from the surrounding line systems. Since these schemes rely on LOL detection performed by PXC ports, appropriate provisioning of OEOs is required to turn off the laser on the drop side Tx. There are various approaches to enforce this OEO behavior and are discussed in section 6. Hence, for failure isolation purposes, we assume that an LOL condition at a given PXC has been detected through an appropriate OEO behavior. As described in section 6, in some of the LOL behaviors, some of the failure modes will not be detected. Similarly, there are a few situations in which detection of an LOL by PXC is not sufficient to isolate the faire. It is assumed that these are exceptions to the failure isolation without TNNI.

Some of these failure isolation approaches are discussed below.

7.1.1 Negotiation between Adjacent PXCs

Figure 27:
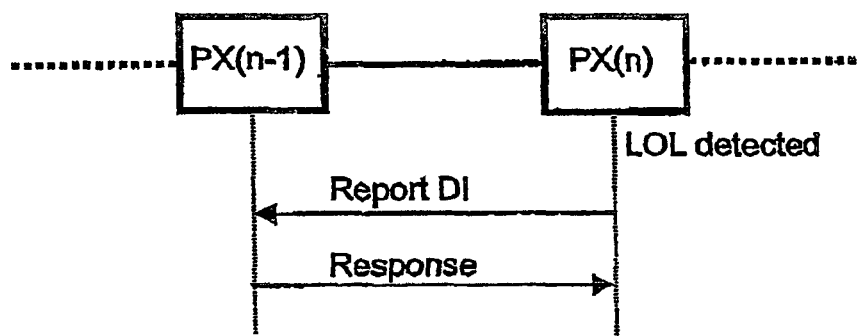
FIG. 27 shows exemplary failure isolation through negotiation with an upstream node in accordance with an embodiment of the present invention.

In this scheme, PX(n), after making a detection of failure condition (based on LOL), sends a request to the upstream node, PX(n−1), to verify if the failure has been detected by the upstream node. In case the response is negative, it can be assumed that the failure lies between the link PX(n−1)-PX(n). FIG. 27 depicts failure isolation through negotiation between adjacent PXCs.

Note: Even though we have described this scheme with the assumption that TNNI is not available, even when TNNI is available, failure isolation can be improved through negotiation between adjacent PXCs.

7.1.1.1 Issues

There are some performance related issues with negotiation between adjacent nodes. Since in this case the link failure between the upstream node and the given PXC can potentially affect XNNI signaling network, additional transmission delays can be encountered during convergence of signaling network. This implies that larger timers are required to accommodate delayed response from the upstream node.

7.1.2 OCH-FDI

Figure 28:
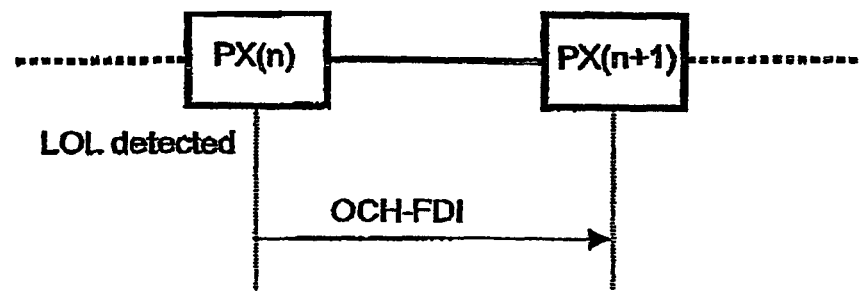
FIG. 28 shows exemplary failure isolation through out-of-band AIS signaling.

In this scheme, an out of band message, denoted as OCH-FDI, is transmitted in the downstream direction from a PXC node which has successfully detected a failure in the network (based on LOL). This signal can be utilized by the downstream node to see if the locally detected failure is a result of an upstream condition. To enhance the accuracy of failure isolation, it may be required to send the OCH-FDI at regular intervals until the failure condition disappears. FIG. 28 depicts failure isolation through out-of-band AIS signaling.

Since this scheme emulates the AIS behavior supported through an in-band signaling scheme within an optical network, it has an additional advantage of being compatible with the telecom grade alarm suppression and forwarding behavior of line systems.

7.1.2.1 Issues

Even through this scheme overcomes the issue of negotiation between adjacent PXCs and longer response timers, it still suffers from reliability of failure isolation of the assumed OEO behavior. In other words, the failure indication forwarding enhancement does not eliminate the possible problems with the failure isolation through LOL.

Even though AIS indications are very effective in failure isolation with in-band signaling available in SONET and digital wrapper networks, the same level of robustness is not possible with out-of-band AIS signaling. For example, to overcome race conditions between signaling delays of out-of-band OCH FDI and a local fault indication, which can be fast due to its coupling with optical transmission, larger integration timers are required.

7.2 Failure Isolation with TNNI

Failure isolation can be easily performed in case the defect indications are available through TNNI protocol between PXC and the surrounding line systems. This approach will require FDIs at all of the nodes along a given lightpath and BDI in addition to FDI at end-nodes (to isolate client signal defects without an OEO between client and PXC, BDI will be required).

Since for 1+1 and SPMesh connections, the defect indications are only required at end-nodes of a lightpath, the end-nodes should be listening to these defect indications as soon as they are reported from surrounding OEOs. However, once the failure has been detected by the end-nodes and protection switching is being performed, appropriate defect indications can be collected from nodes along the affected path to isolate the failure to a particular link and/or node. In this case, the first node which has seen a defect indication other than AIS will be considered as the downstream edge of the failed link.

On the other hand, for ASON connections, where a redial of the affected path has to be performed, the failure isolation is in series with the protection switching event, and therefore will require continuous monitoring of defect indications all along the lightpath.

7.3 Failure Isolation through Idle Link Verification

This approach will be required to isolate failures if the defect reporting is achieved through OEOs or receivers integrated on the add/drop ports of PXC (Type 7-10, sections 6.1.7-6.1.10). In this case, once the defect has been reported, a request can be sent to all of the nodes along the given path to perform link verification. Based on the response of link verification, failure can be isolated to a particular link.

It should be noted that ASTN redial efficiency is generally maximized with rapid failure isolation. This means that ASTN should not tear down the path until failure isolation is completed.

It should be noted that failure isolation will generally require BDI (in band or out of band).

It should be noted that the terms such as "router" and "switch" are used herein to describe communication devices that may be used in a communication system, and should not be construed to limit the present invention to any particular communication device type. Thus, a communication device may include, without limitation, a bridge, router, bridge-router (brouter), switch, node, or other communication device.

It should also be noted that the term "message" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should be noted that certain of the described link discovery, verification, and failure isolation functions can be performed or controlled through computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for determining unknown optical communication links between two adjacent network elements in an optical communication system, each network element comprising a number of transmit interfaces and a number of receive interfaces, the method comprising:
   generating an optical signal at a first one of the network elements, the optical signal being transmitted over one of its transmit interfaces;
   receiving the optical signal at one of:
     a receive interface of a second one of the network elements; and
     a receive interface of said first one of the network elements; and
   detecting an established, but previously unknown, optical communication link between a transmit interface of the first one of the network elements and the receive interface of the second one of the network elements and a corresponding optical communication link between a transmit interface of the second one of the network elements and the receive interface of the first one of the network elements based upon at least the received optical signal,
   wherein the optical signal comprises an identity pattern that uniquely identifies a transmit port of the first one of the network elements, and
   wherein detecting the established, but previously unknown, optical communication link between the transmit interface of the first one of the network elements and the receive interface of the second one of the network elements comprises:
     recovering the identity pattern from the received optical signal; and
     detecting the established, but previously unknown, optical communication link based upon the recovered identity pattern,
   wherein detecting the established, but previously unknown, optical communication link based upon the recovered identity pattern comprises:
     obtaining a table that maps each of a number of identity patterns to a corresponding transmit interface of the first one of the network elements; and
     determining from the table that the recovered identity pattern maps to the transmit interface of the first one of the network elements, and
   wherein the table further maps each identity pattern and corresponding transmit interface of the first one of the network elements to a corresponding receive interface of the first one of the network elements, and wherein detecting the established, but previously unknown, optical communication link between the transmit interface of the second one of the network elements and the receive interface of the first one of the network elements comprises:
     inferring the established, but previously unknown, optical communication link from the mapping in the table.

2. The method of claim 1, wherein the optical signal comprises at least one of:
   a sustained light on condition;
   a sustained light off condition;
   a plurality of successive light on and light off conditions that vary according to a predetermined pattern;
   an optical signal that is modulated according to a predetermined data sequence;
   an optical signal that is modulated according to a pilot tone;
   an optical signal at an unused wavelength;
   amplified spontaneous emission noise;
   an alarm signal; and
   an optical signal that produces an invalid received signal at the receive interface.

3. The method of claim 1, wherein generating the optical signal at the first one of the network elements comprises:
   instructing the first one of the network elements to generate the optical signal by the second one of the network elements using a predetermined protocol.

4. The method of claim 1, wherein generating the optical signal at the first one of the network elements comprises:
   allocating a test transmitter; and
   crossconnecting the test transmitter to the transmit interface of the first one of the network elements.

5. The method of claim 1, wherein receiving the optical signal at the receive interface of the first one of the network elements comprises:
   receiving the optical signal at the receive interface of the second one of the network elements; and
   causing the optical signal to be looped back from the receive interface of the second one of the network elements to the transmit interface of the second one of the network elements.

6. The method of claim 1, wherein receiving the optical signal at the receive interface of the first one of the network elements comprises:
   allocating a test receiver; and
   crossconnecting the test receiver to the receive interface of the first one of the network elements.

7. An optical communication system comprising:
   a plurality of interconnected network elements, each network element comprising a number of transmit interfaces and a number of receive interfaces;
   means for automatically discovering established, but previously unknown, optical communication links between adjacent network elements; and
   means for verifying the optical communication links;
   means for generating defect indications by a number of network elements in response to a failure;
   means for receiving the defect indications by at least one photonic cross-connect device among the plurality of interconnected network elements; and means for isolating the failure in the optical communication system based upon the defect indications received by the at least one photonic cross-connect device.

8. The optical communication system of claim 7, wherein the means for automatically discovering established, but previously unknown, optical communication links between adjacent network elements comprises:
  means for causing a first one of the network elements to generate an optical signal over one of its transmit interfaces;
  means for causing the optical signal to be received at one of:
    a receive interface of a second one of the network elements; and
    a receive interface of said first one of the network elements; and
  means for detecting an optical communication link between a transmit interface of the first one of the network elements and the receive interface of the second one of the network elements and a corresponding optical communication link between a transmit interface of the second one of the network elements and the receive interface of the first one of the network elements based upon at least the received optical signal.

* * * * *